US012059099B2

(12) United States Patent
Atinaja et al.

(10) Patent No.: US 12,059,099 B2
(45) Date of Patent: *Aug. 13, 2024

(54) VARIABLE TEMPERATURE BLENDER

(71) Applicant: Columbia Insurance Company, Omaha, NE (US)

(72) Inventors: Brian Atinaja, Carol Stream, IL (US); Michael Mastroianni, Addison, IL (US); Laura Hickman, Addison, IL (US); Stephanie Michel, Addison, IL (US); Tim Hagedorn, Addison, IL (US)

(73) Assignee: Columbia Insurance Company, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,660

(22) Filed: May 14, 2022

(65) Prior Publication Data
US 2022/0273142 A1 Sep. 1, 2022

Related U.S. Application Data

(62) Division of application No. 16/938,947, filed on Jul. 25, 2020, now abandoned.
(Continued)

(51) Int. Cl.
A47J 43/046 (2006.01)
A23L 5/10 (2016.01)
(Continued)

(52) U.S. Cl.
CPC ............ A47J 43/046 (2013.01); A23L 5/15 (2016.08); A23L 21/10 (2016.08); A47J 27/004 (2013.01);
(Continued)

(58) Field of Classification Search
CPC .... A47J 43/046; A47J 43/0716; A47J 43/075; A47J 27/004; A23L 5/15; A23L 21/10; B02C 25/00
See application file for complete search history.

(56) References Cited

U.S. PATENT DOCUMENTS 3,176,967 A    4/1965  Hartley
3,176,968 A *  4/1965  Appleton ............... A47J 43/046
                                                      366/205
(Continued)

FOREIGN PATENT DOCUMENTS

CN     102499586 A    6/2012
CN     206062974 U    4/2017
(Continued)

Primary Examiner — Steven N Leff
(74) Attorney, Agent, or Firm — Thompson Coburn LLP

(57) ABSTRACT

A variable temperature blender is disclosed for the cooking and preparation of heated sauces, jams, soups, purees, alternative milks, smoothies and more. A variable temperature blender has a lid assembly, a vessel assembly, and a base assembly. The vessel assembly has a blending vessel and a collar attached to a bottom portion of the blending vessel. The base assembly have a user interface, a motor, and a controller. A heating element positioned within the collar of the vessel assembly received an electronic signal from the controller via an electrical interface connecting the base assembly with the vessel assembly. The electronic signal activates or deactivates the heating element based on an operational mode of the variable temperature blender to heat a food item contained within the blending vessel.

20 Claims, 30 Drawing Sheets

Related U.S. Application Data

(60) Provisional application No. 62/878,571, filed on Jul. 25, 2019.

(51) Int. Cl.
*A23L 21/10* (2016.01)
*A47J 27/00* (2006.01)
*A47J 27/21* (2006.01)
*A47J 36/32* (2006.01)
*A47J 43/07* (2006.01)
*B02C 25/00* (2006.01)

(52) U.S. Cl.
CPC ....... *A47J 27/21091* (2013.01); *A47J 36/321* (2018.08); *A47J 43/0716* (2013.01); *A47J 43/075* (2013.01); *B02C 25/00* (2013.01); *A23V 2002/00* (2013.01)

(56) References Cited

U.S. PATENT DOCUMENTS

| | | | |
|---|---|---|---|
| 3,825,723 A | 7/1974 | Roeser | |
| 6,505,545 B2 | 1/2003 | Kennedy et al. | |
| 6,703,061 B2 | 3/2004 | Kennedy et al. | |
| D525,482 S | 7/2006 | Kassenaar | |
| 8,152,083 B2 | 4/2012 | Bower et al. | |
| 9,089,238 B2 | 7/2015 | Lin | |
| D758,787 S | 6/2016 | Ou | |
| D807,118 S | 1/2018 | Kettavong et al. | |
| 9,855,535 B2 | 1/2018 | Arnett et al. | |
| 10,085,599 B2 | 10/2018 | Benoit et al. | |
| 10,327,594 B2 | 6/2019 | Ivarsson et al. | |
| 2002/0027175 A1 | 3/2002 | Capp | |
| 2004/0042337 A1 | 3/2004 | Yiu et al. | |
| 2004/0208976 A1 | 10/2004 | Kuhns et al. | |
| 2006/0286255 A1 | 12/2006 | Xu et al. | |
| 2008/0190301 A1* | 8/2008 | Peng | A47J 36/165 99/348 |
| 2008/0264270 A1* | 10/2008 | Peng | A47J 43/0716 99/485 |
| 2015/0000534 A1 | 1/2015 | Hager et al. | |
| 2015/0101491 A1* | 4/2015 | Lin | A47J 27/004 99/348 |
| 2015/0117137 A1* | 4/2015 | Haney | B01F 35/31 366/205 |
| 2015/0305566 A1* | 10/2015 | Koetz | B01F 35/22 366/342 |
| 2016/0174771 A1* | 6/2016 | Benoit | A47J 44/02 99/348 |
| 2017/0071413 A1* | 3/2017 | Park | H05B 6/12 |
| 2018/0206677 A1 | 7/2018 | Ivarsson et al. | |
| 2019/0117013 A1 | 4/2019 | Kim | |

FOREIGN PATENT DOCUMENTS

| | | | | |
|---|---|---|---|---|
| CN | 206062975 U | 4/2017 | | |
| CN | 206239240 U | 6/2017 | | |
| WO | WO-2013126734 A1 * | 8/2013 | ............... | A23L 1/06 |
| WO | WO-2017063872 A1 * | 4/2017 | ............ | A47J 27/004 |

* cited by examiner

VARIABLE TEMPERATURE BLENDER

CROSS-REFERENCE AND PRIORITY CLAIM TO RELATED PATENT APPLICATIONS

This non-provisional patent application is a divisional of U.S. patent application Ser. No. 16/938,947, filed on Jul. 25, 2020, and entitled "Variable Temperature Blender", the entire disclosure of which is incorporated herein by reference. This non-provisional patent application also claims priority to U.S. provisional patent application 62/878,571, filed Jul. 25, 2019, and entitled "Variable Temperature Blender", the entire disclosure of which is also incorporated herein by reference.

INTRODUCTION

Food processing products are used commonly used to reduce the preparation time in the preparations of ingredients for meals. These processing products may also have stand-alone usage in the preparation of drinks and other specific dishes where the food products must be prepared at a certain consistency. Along with food processors, blenders are a common product used to prepare ingredients and drinks in this manner. Common blenders usually include a lid, food containment vessel, blade, motor, and base. An accessible user interface allows for cooks and consumers to adjust and operate these blenders. Many blenders have a rounded or square base structure allowing the blender to rest steadily on a counter-top or other flat surface. Blenders are common food processing tools and there are many currently on the market which offer various vessel sizes, different blade configurations, and utilize different component materials to best meet customer needs. These needs include whether the blender will be used for commercial or domestic cooking purposes and the types of food preparation that is to occur in their containment vessels. Traditionally, blenders for food preparation utilize a sharp "X" style blade designed for food cutting and chopping whereas blenders used in drink preparation utilize a duller "wing" style blade suitable for ice crushing.

Blender operation commonly requires the user to remove the lid, insert ingredients into the blending vessel, and finally select the desired blend setting or speed to achieve the desired end consistency. Some blender designs allow the vessel to be detachable from the base for the easy transfer of the blended food or drink ingredients. Blenders are often sold with tampering attachments to adjust the location of the ingredients within the vessel that would impede optimal operation of the blades.

Blenders are commonly used to prepare room temperature or cold ingredients. Blenders themselves are not ideal to prepare hot or heated ingredients as the shape and size of the containments vessels are not ideal to provide ample and appropriate cooking heat to the food product. To improve upon existing blender technologies, the inventors have envisioned a blender capable of overcoming and improving upon some of these short comings. The blender envisioned by the inventors has the capability of operating at variable temperatures to properly and correctly complete food preparation at either a cold or hot blending process. Depending on variable factors such as altitude, ingredient consistency, and desired volumes, it is difficult to determine the best setting and precise functionality to control the blender. By including a heating element into a blender, the heating element not only allows for the preparation of heated food but also allows the user to cook with greater precision and ease, reduces time required for cooking calculations and the opportunity for human error, and eliminates the need for first heating the food products via another appliance and transitioning the food products into the blender.

As such, the inventors propose the following disclosure pertaining to a variable temperature blender capable of operating at pre-programmed settings or custom settings defined by the user at the time of operation. The inventor's device also allows for a greater magnitude of possible cooking operations both in the area of cold food preparation and hot food preparation. The envisioned blender also allows for instruction to the user and prompts to add ingredients allowing for increased flexibility in cooking complex food preparation items and techniques.

Further features and advantages of the disclosed embodiments, as well as the structure and operation of various elements of the disclosed embodiments, are described in detail below with reference to the accompanying drawings.

BRIEF DESCRIPTION OF THE DRAWINGS

The accompanying drawings, which are incorporated in and form a part of the specification, illustrate the disclosed embodiments and together with the description, serve to explain certain inventive principles.

DETAILED DESCRIPTION OF EXAMPLE EMBODIMENTS

Figure 1:
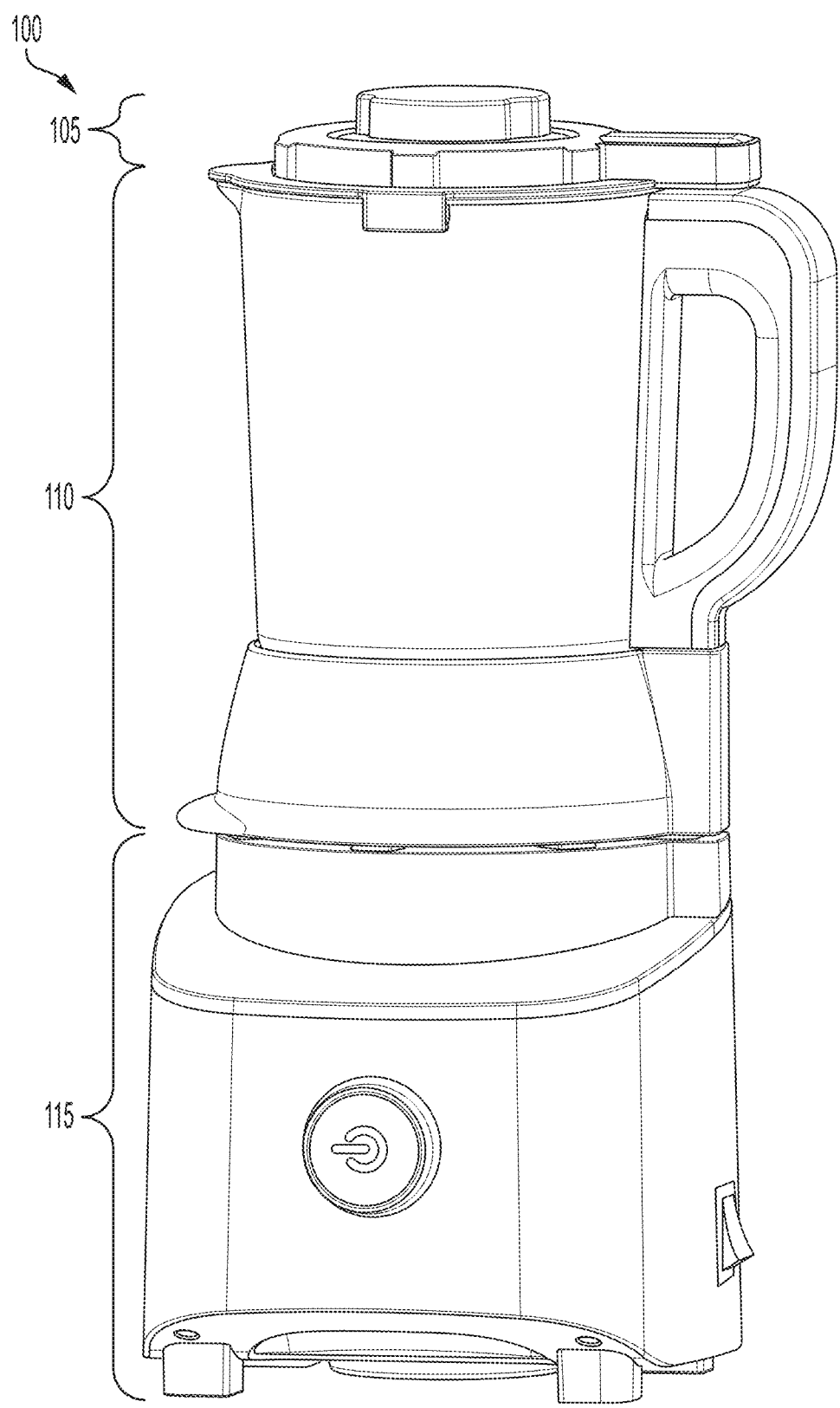
FIG. 1 shows a perspective view of a variable temperature blender as described herein in an embodiment of the disclosure.

Referring to the accompanying drawings, FIG. 1 illustrates a variable temperature blender 100 for use in preparing either hot or cold food ingredients or food/drink recipes. Food preparation processes may include, but are not limited to the preparation of hot and cold milks, sauces, purees, and drinks. As viewed in FIG. 1, the variable temperature blender 100 may include three main portions: a lid assembly 105, a vessel assembly 110, and a base assembly 115. FIGS. 2-7 provide additional details and discussion of each of the main portions of the variable temperature blender 100.

Figure 2:
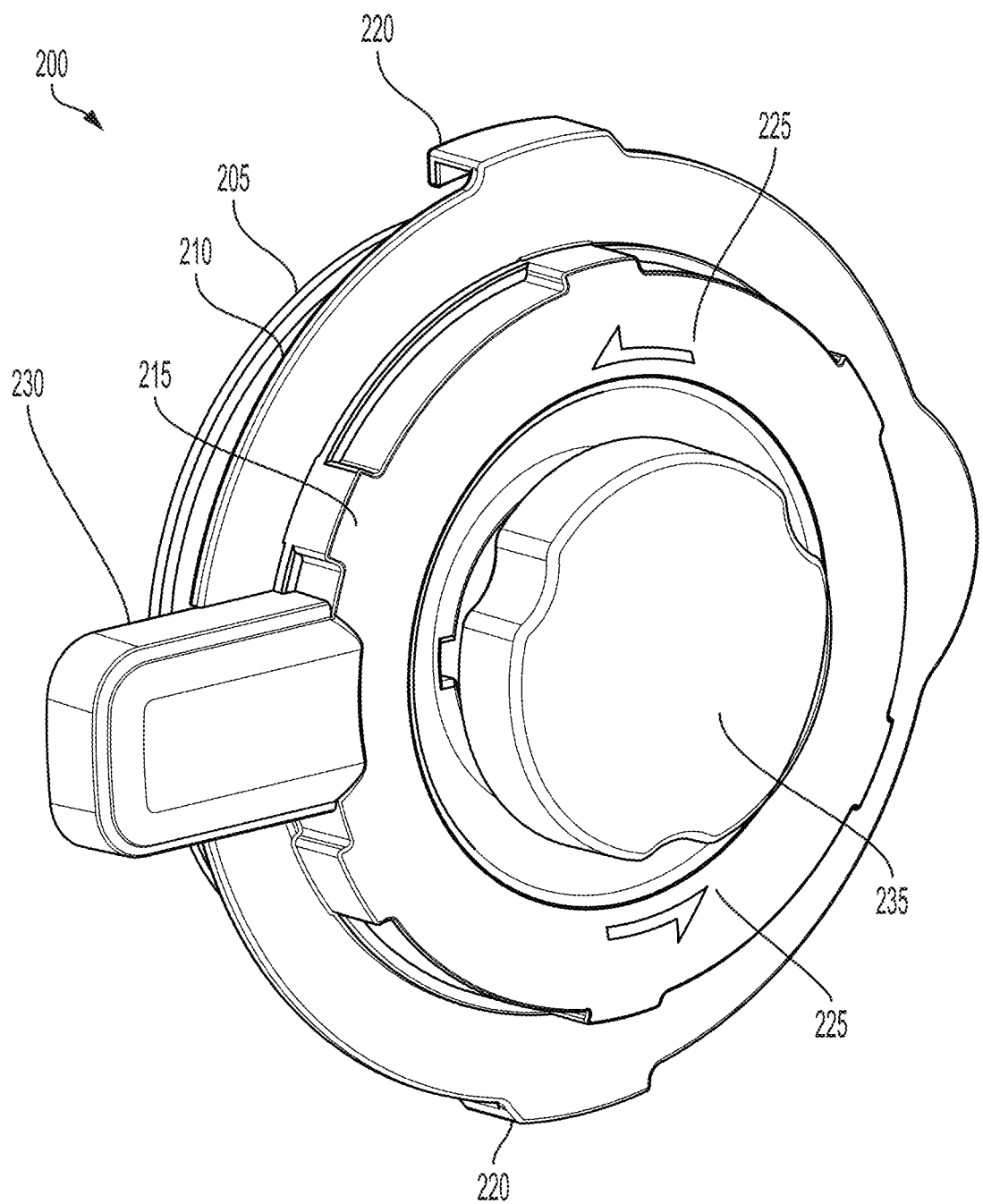
FIG. 2 shows a perspective view of a lid assembly of the variable temperature blender in an embodiment of the disclosure.

FIG. 2 shows an embodiment 200 of the lid assembly (105) of the variable temperature blender (100). The lid assembly 200 may include a lid 205 having an outer lid circumferential portion 210 and an inner raised lid portion 215. The outer lid circumferential 210 portion may extend to a greater diameter than the vessel assembly (110) upon which the lid assembly 200 can rest and attach. A plurality of lid notches 220 may be positioned on the edges of the outer lid circumferential portion 210. The plurality of lid notches 220 in an embodiment of the disclosure may have an L shaped design and positioned approximated 180 degrees from one another. The lid assembly 200 disclosed in FIG. 2 has two lid notches 220, however other variations and numbers of notches may also be used. When the lid assembly 200 is placed on top of the vessel assembly (110), the lid assembly 200 may be rotated to lock the plurality of lid notches 220 with the vessel assembly (110).

The inner raised lid portion 215 may have a smaller diameter than the outer lid circumferential portion 210 and extend in an upward direction of the lid assembly 200. The edge of the inner raised lid portion 215 may have a contour and configuration (e.g., grip/indent portions) allowing for easy access by a user to grip the lid assembly 200 for placement and removal of the lid assembly 200 upon the vessel assembly. In some embodiments, the inner raised lid portion 215 may have lettering (not shown) and/or other (e.g., directional) markings 225 such as arrows, indicative of operational instruction(s) to attach and remove the lid assembly 200 from the vessel assembly (110). Extending from part of a circumferential edge of the inner raised lid portion 215 is a lid safety member 230. When the lid assembly 200 is placed upon the vessel assembly (110) and moved to a locked operational position via the plurality of lid notches 220, the lid safety member 230 may align with a similar portion (e.g., a top portion of a handle of the vessel assembly) of the vessel assembly 110 to indicate to the user that the lid assembly 200 is in proper positioning for operation of the variable temperature blender 100. The lid safety member 230 may have a lid safety protrusion (not shown) that can extend downward and mate into the vessel assembly (110), as described below.

A gasket portion (not shown) may also be part of the lid assembly 200. The gasket portion, in an embodiment of the disclosure, may extend outward from the side of the downward extending the outer lid circumferential portion 210. The gasket portion may have a diameter that is slightly smaller than the diameter for the vessel assembly (110), and may fit into the vessel assembly (110) when the lid assembly 200 is placed on top of the vessel assembly (110). The shape of the gasket portion allows a seal to form between the vessel assembly (110) and the lid assembly 200 where the vessel assembly (110) contacts an outer surface of the gasket portion and a bottom surface of the outer lid circumferential portion 210. Sealing devices (not shown), such as but not limited to O-rings and other silicone members, may surround the gasket portion allowing for the formation of a tight seal preventing the escape of food particles and liquids.

In some embodiments, the lid assembly 200 may also have an aperture running through the middle of both the inner raised lid portion 215 and the outer lid circumferential portion 210. A lid cap 235 may be placed within this aperture and secured to the sides of the inner raised lid portion 215 by a locking mechanism. The lid cap 235 may have a contour and configuration (e.g., grip/indent portions) and may exist for insertion of ingredients into the vessel assembly (110) or as an access point for cooking utensils such as a tamper to dislodge ingredients from the interior of the vessel assembly (110). For high altitude cooking, the lip cap 235 may be replaced with a boil-over guard (not shown) that can fit within the aperture and attach to the lid assembly 200 in a similar fashion as the lid cap 235. During operational use of the variable temperature blender (100), ingredients may be inserted through the aperture after the inner raised lid portion 215 and the outer lid circumferential portion 210 are placed into a locked position with the vessel assembly (110). In other embodiments, the lid assembly 200 may be removed entirely for the insertion of ingredients. The entirely of the lid assembly 200 may have a multitude of configurations based on the shape and size of the vessel assembly (110) to which it is to be attached. The lid assembly 200 maybe circular, rectangular, or square in shape, or any other configuration to adequate fit and secure to the vessel assembly (110).

Figure 3:
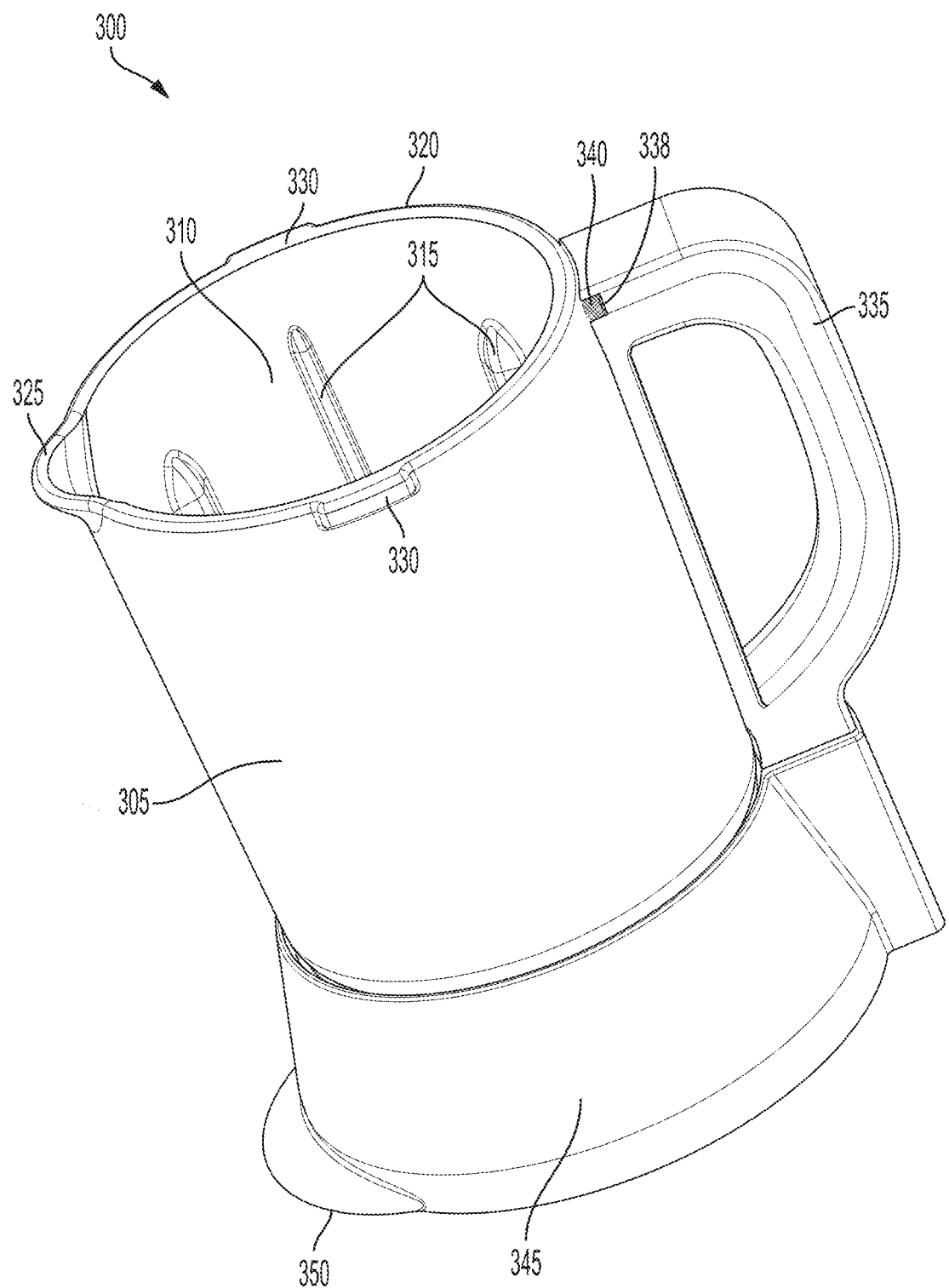
FIG. 3 shows a perspective view of a vessel assembly of the variable temperature blender in an embodiment of the disclosure.

Turning now to FIG. 3, a perspective view of an embodiment 300 of the vessel assembly (110) of the variable temperature blender (100) is shown. The vessel assembly 300 may include a blending vessel 305 having a hollow interior volume 310. The blending vessel 305 provides a space to house food ingredients and liquids for mixture during operation of the variable temperature blender 100. The blending vessel 305 may be made of a glass material, although it should be understood that other materials may be sufficient, such as but not limited to, stainless steel or plastic polymers. The blending vessel 305 may contain grooves 315 on the interior walls to aid in the blending process by preventing excess food particle build up on the interior walls as the variable temperature blender 100 is in operation. A top rim 320 of the blending vessel 305 can be configured to mate with the shape of the lid assembly 200 disclosed above and described/shown in earlier figures. In some embodiments, the top portion of the blending vessel 305 may have an outward protrusion 325 that continues until the top rim 320. This outward protrusion 325 may form a spout or any other easy travel path that allows for mixed food ingredients or liquids to be transferred from the blending vessel 305 to an outside bowl or container (not shown). Also present in some embodiments of the disclosure are a plurality of latches 330 that extend radially from the top rim 320 of the blending vessel. The plurality of latches 330 may fit with/into the plurality of notches (220) present on the lid assembly (200) when the lid assembly (200) is placed on top of the vessel assembly 300 and rotated into the correct operational position. For example, in some embodiments the plurality of latches 330 may be located approximately 180 degrees from one another. Although FIG. 3 shows the presence of two latches as the plurality of latches 330, it should be understood that different numbering combination of latches may be used with the corresponding number of notches of the lid assembly based on the various different shape and size configurations of the vessel assembly.

In some embodiments, the vessel assembly 300 may include a handle component 335 that can attached or be formed into the exterior wall of the blending vessel 305. The handle 335 provides an ergonomic gripping surface for easy handling by the user of the variable temperature blender 100. The handle 335 allows the user to remove the vessel assembly 300 from the base assembly 115 in a lifting action and also allows the user to place the vessel assembly 300 on top the base assembly 115 allowing for operation of the variable temperature blender (100). At the top of the handle 335 is a portion 340 (e.g., a spacing) which allows the lid safety member (e.g., protrusion) (230) to align with and/or enter into the interior of the handle 335. While within the interior of the handle 335, the lid safety member (e.g., protrusion) (230) activates a lid switch 338 within the handle 335. The lid switch 338 is in electrical communication with a vessel electrical interface, described below. Placement of the lid safety member (e.g., protrusion) (230) within the spacing 340 of the handle 335 sends an electrical signal to the vessel electrical interface indicating that the lid assembly (200) is properly mated with the vessel assembly 300. If such a true condition is met, the variable temperature blender (100) is able to be placed into an operable mode.

Below the blending vessel 305 is a collar 345 of the vessel assembly 300. The collar 345 is formed into a shape and configuration to mate with the base assembly (115) of the variable temperature blender (100). The collar 345 houses mechanical connections and electrical and/or electronic components of the vessel assembly 300, described below. These electrical and/or electronics include a heating element and the vessel electrical interface that will be discussed in greater detail below. The collar 345 may have a protruding portion 350 formed as a lip or gripping surface to provide the user with another handling interface, such as for removal/installation of the vessel assembly 300 to/from the base assembly (115), for example.

Figure 4:
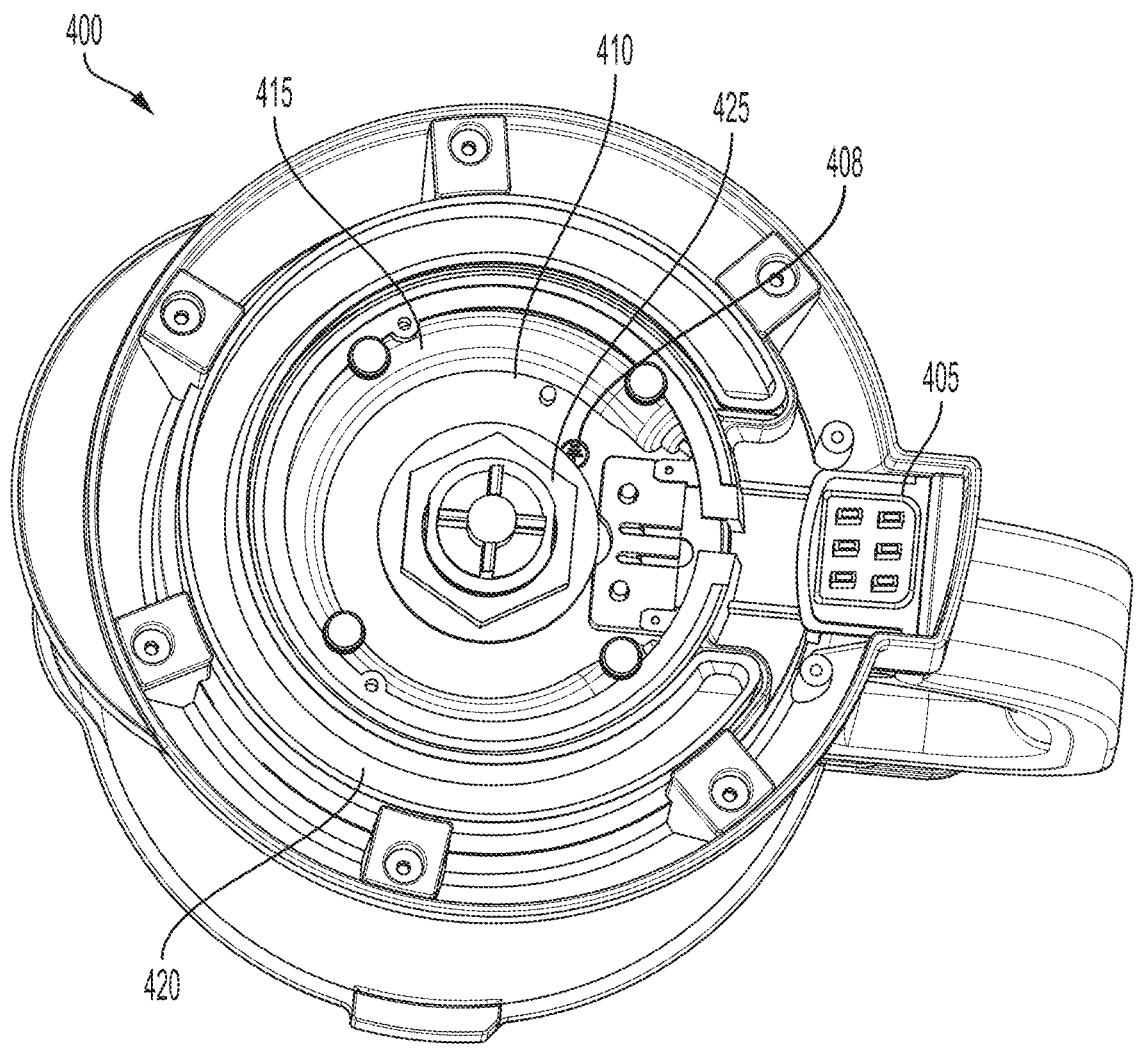
FIG. 4 shows a bottom perspective view of the vessel assembly of the variable temperature blender in an embodiment of the disclosure.

Turning now to FIG. 4, a bottom perspective view of an embodiment 400 of a bottom of the vessel assembly (300) is shown, with the vessel electrical interface 405 being visible. In an embodiment of the disclosure, the vessel electrical interface 405 is a male pin configuration that can mate with the base assembly (115). The vessel electrical interface 405 is in communication with the lid switch (338), a heating element, and a temperature sensor 408 of the vessel assembly (300). The vessel electrical interface 405 passes power and data signals through these connections to allow for correct operation of the variable temperature blender (100) at the selected mode of operation and also adjusts the temperature of the heating element based on the selected mode of operation.

A plate 410 of the vessel assembly (300) is also shown. The plate 410 is made of any type of thermally conductive material and provides a barrier between the interior of the blending vessel and the interior of the collar. The plate 410, in an embodiment of the disclosure, is made of stainless steel but can be any thermally conductive material that is able to transfer heat from the heating element to the plate. Attached to the plate 410 is a temperature sensor 408. In some embodiments, the temperature sensor 408 is located within the plate 410, and in other embodiments the temperature sensor 408 may be flush with the plate 410 but be a stand-alone component. The temperature sensor 408 connects the interior of the blending vessel (305) to the vessel electronic interface 405 to communicate data signals regarding the temperature of the food items within the interior of the blending vessel (305). In certain modes of operation, the food items are required to reach and maintain a certain temperature for proper food preparation. The temperature sensor 408 reads a temperature of the food items and in turn communicates the reading back to the base assembly for proper adjustment.

Surrounding the plate 410 and contained within the collar (345) is a heating element 415 of the variable temperature blender (100). The heating element 415, like the temperature sensor 408, is in electronic communication with the vessel electrical interface 405. In an example embodiment of the disclosure, the heating element 415 may have a power output of 600 watts, but other possible power values are envisioned. During operation, the heating element 415 is controlled by electrical signals received by the vessel electrical interface 405 from the base assembly (115). When activated, the heating element 415 provides a thermal output that is transferred to the plate 410 of the vessel assembly (300). Based on temperature readings achieved by the temperature sensor 408 and communication to the base assembly (115), the heating element 415 may be turned on or off to increase the temperature of the food items, decrease the temperature of the food items, or maintain the temperature of the food items. Specific operational cycles of the variable temperature blender (100) require different and specific heating temperatures of the food items. The ability of the heating element 415 to provide the variable heat and temperature maintenance allows the variable temperature blender (100) to perform cooking methods and operations previously not achievable within a common blender.

Also viewed in FIG. 4 is a mating receptacle 420 of the collar (345). The mating receptacle 420 may be created to allow for a friction form fit between the vessel assembly (300) and the base assembly (115). A corresponding mount (described below) of the base assembly (115) will fit within the mating receptacle 420 of the vessel assembly (300) and may be held in place by friction so that the vessel assembly (300) does not move during operation of the variable temperature blender (100). Of course, other locking mechanisms between the base assembly (115) and the vessel assembly (300) may be employed.

Located in the center of the vessel assembly (300) is a nut 425 for connection between the vessel assembly (300) and the base assembly (115). When the mating receptacle 420 of the collar (345) is positioned on the base assembly (115), the nut 425 contacts a motor plug (described below) of the base assembly (115) to allow the base assembly (115) to drive the blade assembly (described below) of the variable temperature blender (100). The nut 425 may be made of any structurally sound material which can hold up to the high revolutions per minute (RPM) of the motor operating within the base assembly (115). In an embodiment of the disclosure, the nut 425 is a metal nut, but plastic or high density rubber may also be used to achieve similar results.

Figure 5:
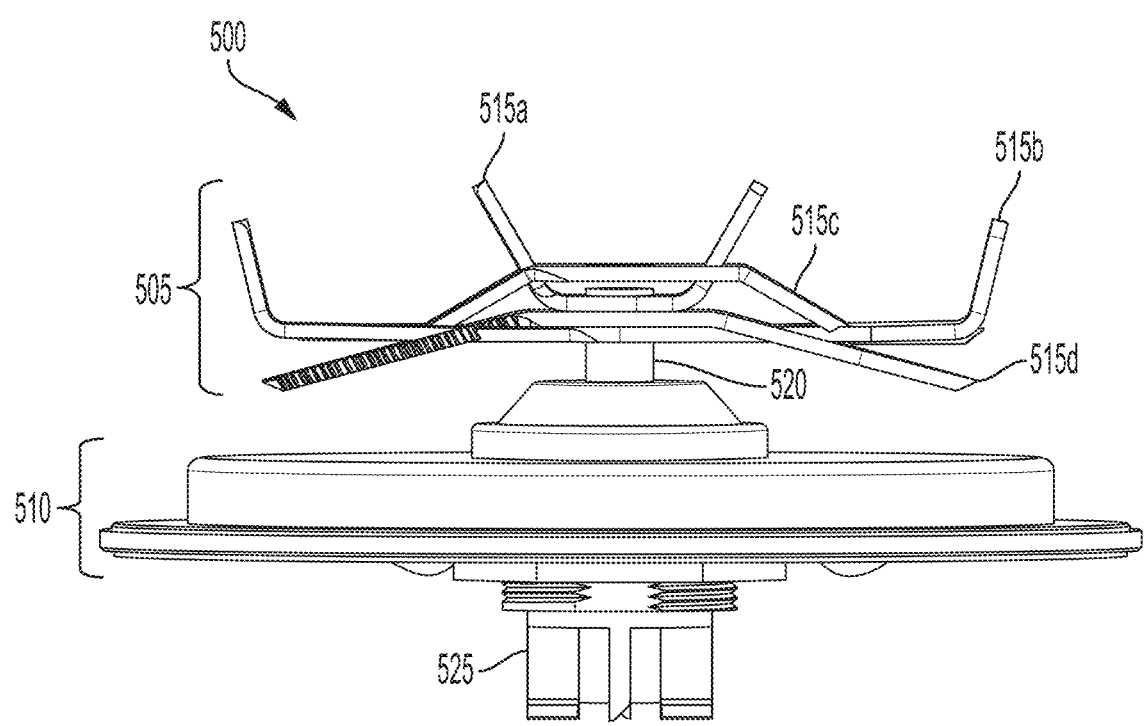
FIG. 5 shows a perspective side view of a blade assembly and plate removed from the vessel assembly of the variable temperature blender in an embodiment of the disclosure.

FIG. 5 shows a perspective side view of an embodiment 500 of a blade assembly 505 of a plate 510 (aka 410) removed from the vessel assembly (300). The plate 510, in an embodiment of the disclosure, is circular in nature to conform to fit to a bottom rim of the blending vessel (305). The blade assembly 505 has a plurality of blades 515a, 515b, 515c, and 515d, and rotates about an axis of a blade shaft 520. A nut 525 (aka 425) of the vessel assembly (300) is also viewed traveling through the middle of the plate 510 via the blade shaft 520 and attached to the blade assembly 505 on the other side of the plate 510 (e.g., opposite the blade assembly 505).

In an embodiment of the disclosure, the blade assembly 505 may be the plurality of blades 515a-515d with the blade shaft 520 concentric with the plurality of blades 515a-515d. The blade shaft 520 runs through the plate 510 and is connected to the nut 525. When the nut 525 mates with the base assembly (115), power from the motor within the base assembly drives rotation of the blade shaft 520 and in turn the plurality of blades 515a-515d. A first blade 515a may be present having a flat center wherein a first blade hole is present for mounting around the blade shaft 520. The first blade 515a may have V shaped projections on each side each at approximately a 58 to 66 degree upward angle for general cutting purposes. A second blade 515b may also be present having an elongated flat center wherein a second blade hole is present for mounting around the shaft and having shortened V shaped projections on each side at a 105 degree angle. Additionally, a third blade 515c may be present having a first portion with a flat center wherein a third blade hole is present for mounting around the blade shaft 520. A second portion of the third blade 515c may be bent downward at an angle of 148 degrees. A third portion of the third blade 515c may be flat and pointed in a V shape. A fourth blade 515d may be present having a first portion with a flat center wherein a fourth blade hole is present for mounting around the blade shaft 520. A second portion of the fourth blade 515d may be bent downward at an angle of 19 degrees wherein the forward edge of one side and the aft edge of the other side have teeth to enhance cutting performance.

Figure 6:
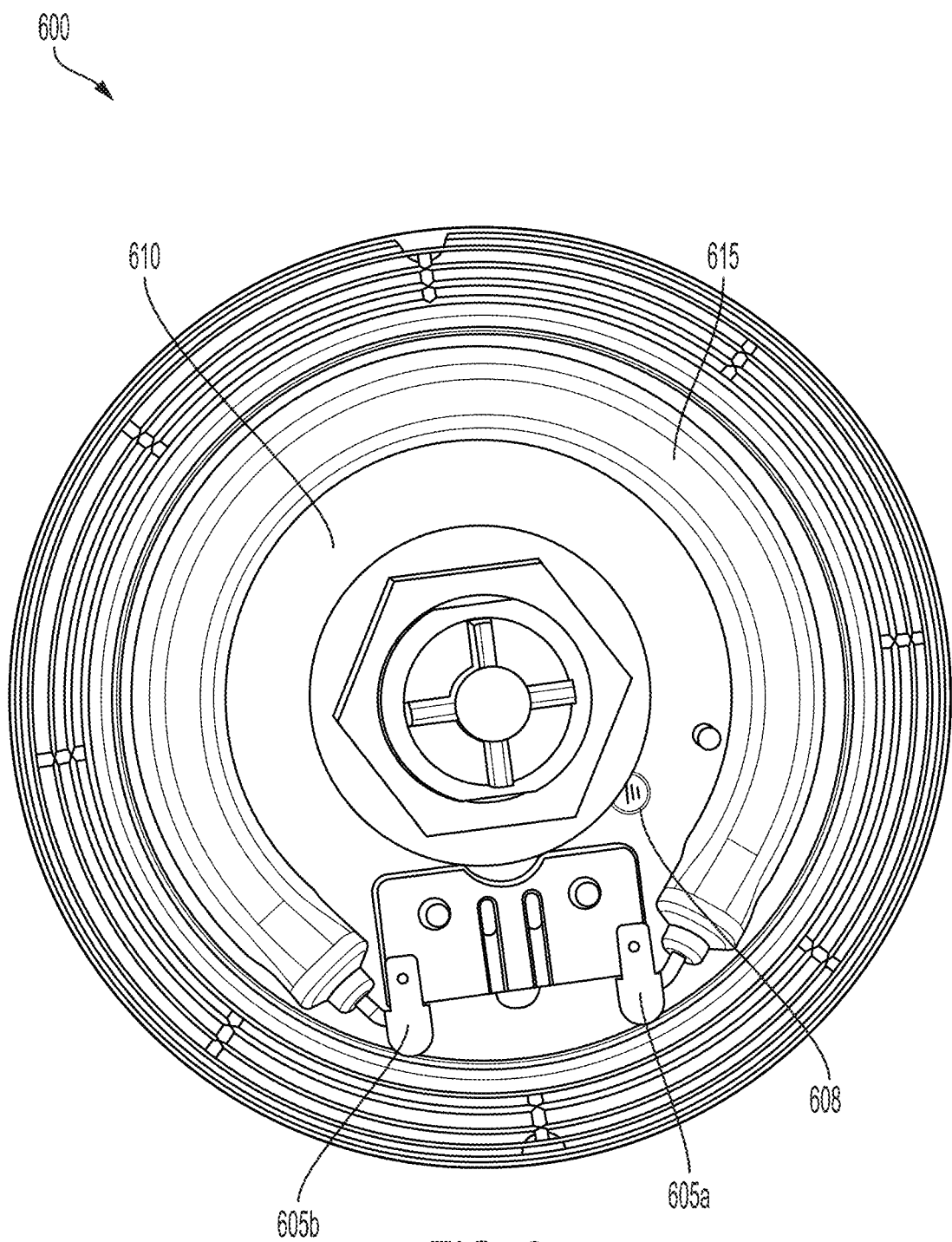
FIG. 6 shows a perspective view of the plate removed from the vessel assembly of the variable temperature blender in an embodiment of the disclosure.

FIG. 6 shows a perspective view of an embodiment 600 of first and second contacts 605a and 605b of a plate 610 (aka 410, 510) of the vessel assembly (300). The heating element 615 (aka 415) is viewed in a circular configuration and terminates at the first contact 605a and the second contact 605b. Each the first contact 605a and the second contact 605b are attached to the vessel electrical interface (405) by wiring. Activation of the heating element 615 can be variable or fixed depending on the chosen operational mode of the variable temperature blender (100). The temperature sensor 608 (408) is also viewed traveling through the plate 610. The plate 610 has a plate aperture (not shown) through with the temperature sensor 608 (408) extends. The temperature sensor 608 (408) is then affixed to the plate so that the temperature sensor 608 (408) can contact the food items to provide an accurate reading of the blending vessel contents. In other embodiment, the temperature sensor 608 (408) may be imbedded within the plate during manufacture to provide the temperature readings of the food items. Like the first and second contacts, the temperature sensor 608 (408) is also connected to the vessel electrical interface by wiring.

Figure 7:
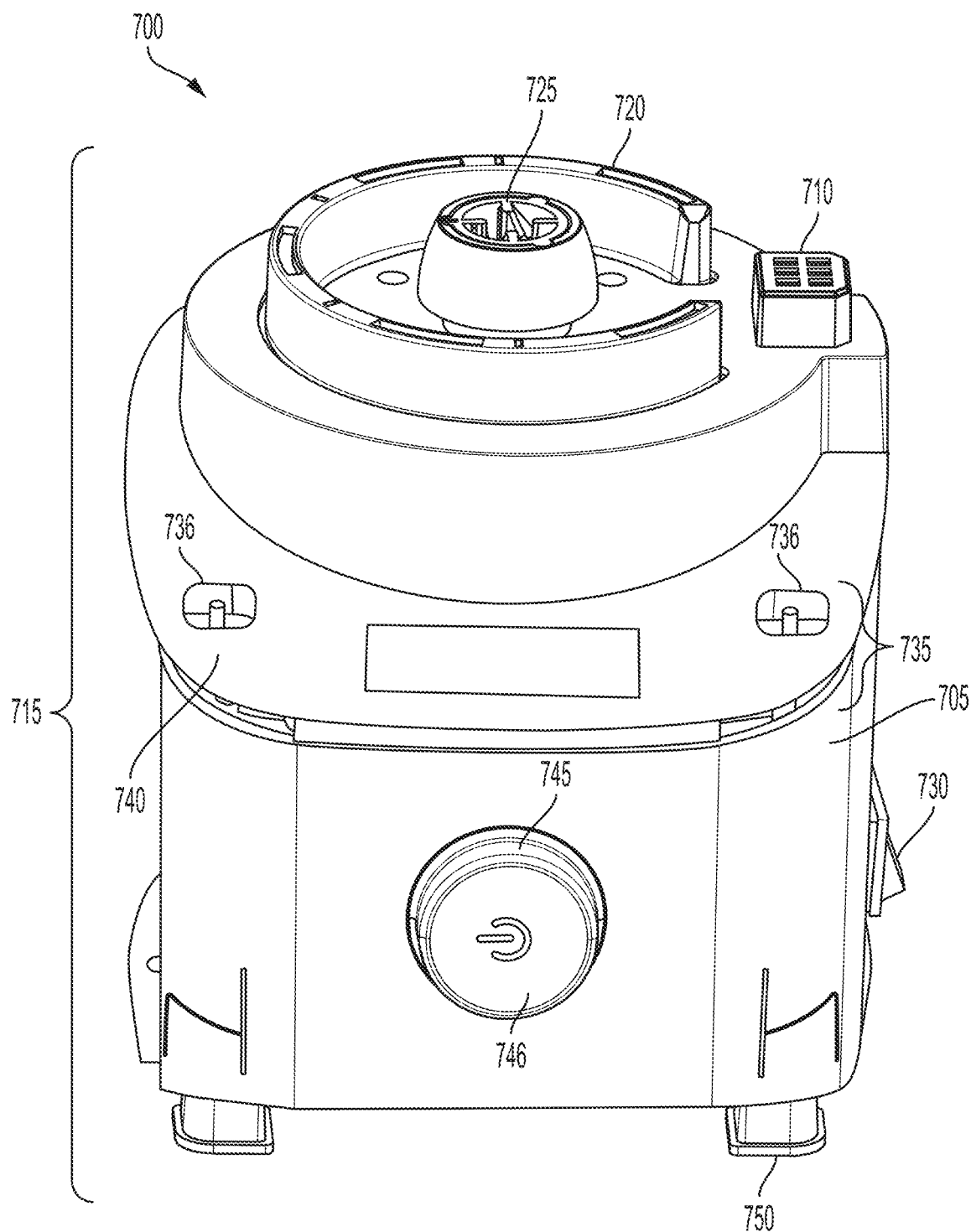
FIG. 7 shows a perspective view of the base assembly of the variable temperature blender in an embodiment of the disclosure.

Turning now to FIG. 7, an embodiment 700 of a base housing 705 and a base electrical interface 710 of a base assembly 715 (aka 115) of the variable temperature blender (100) is viewed. The base assembly 715 may have a base housing 705 that completely encompasses the interior components of the base assembly 715. The base housing 705 may be contoured and configured to allow level attachment between the vessel assembly (300) and the base assembly 715. The base assembly 715 may be made of any structurally solid material. In an embodiment of the disclosure, the base housing 705 may be made of a plastic polymer, but other materials such as metallic alloys are possible. The bottom surface of the base housing 705 is vented allowing heat to be expunged from the base assembly during operation of the variable temperature blender (100).

On the top surface of the base assembly 715 is a base electrical interface 710. The base electrical interface 710 communicates with and plugs into the vessel electrical interface (405) when the vessel assembly (300) is secured on top of the base assembly 715. The base electrical interface 710 may have a pin receptacle configuration and extend from the base assembly 715. The base electrical interface 710 may be a male port to fit securely within the female port of the vessel electrical interface (405). Wires may connect the respective pin configurations to the internal electronics of the base assembly 715.

The base assembly 715 may also have a base mount 720 on the top surface of the base assembly 715. The base mount 720 may be provided in a circular design and configured to mate with the mating receptacle (420) of the collar (345) of the vessel assembly (300). Fitting the base mount 720 into the mating receptacle 420 forms a friction fit. The friction fit holds the vessel assembly (300) to the base assembly 715. Unlike traditional blender designs, the variable temperature blender (100) does not require or need a twist to lock motion to secure the vessel assembly (300) to the base mount 720.

The base assembly 715 may further include a motor plug 725 centered and extending from the top surface of the base housing 705. In an embodiment of the disclosure, the motor plug 725 may be a noise reducing motor plug allowing for quieter operation of the variable temperature blender. As a noise reducing motor plug, the motor plug may be made of a silicone or plastic material such that when mated with the nut of the vessel assembly, the motor plug does not provide frictional noise during operation. The motor plug mates with the nut (525) of the vessel assembly (300) at the top end while the bottom end of the motor plug is connected to a motor shaft (not shown) internally within the base housing 705. The motor shaft is further connected to the motor of the variable temperature blender. The motor may be operated at a variety of speed settings based on the selected operational program by the user. For example, the motor of the variable temperature blender may have nine different speed settings based on revolutions per minute performed by the motor shaft. Setting one may have a 100 RPM speed. Setting two may have a 1000 RPM speed. Setting three may have a 3000 RPM speed. Setting four may have a 5000 RPM speed. Setting five may have a 10000 RPM speed. Setting six may have a 16000 RPM speed. Setting seven may have a 19000 RPM speed. Setting eight may have a 21000 RPM speed. Setting nine may have a 24000 RPM speed.

The base assembly may also have an on/off switch 730 for powering the blender. The on/off switch may be located on a side wall of the base housing 705 and is movable between the on and off positions. While in the on position, power may be supplied to the base assembly through a power cord (not shown) connected to an external power source. In the on position, the user may select any mode of operation and the variable temperature blender will complete the operation so long as the conditions of safe operation are met. While in the off position, the variable temperature blender will not perform any operations requested by the user.

A user interface 735 may also be present on the base assembly 715. A cover plate 740 may cover part of the top surface of the base housing 705 and provide the user interface 735 to the user. A plurality of button positions 736 may be present on the top surface of the base housing and connect to respective buttons on the user interface. The plurality of button positions 736 and user interface 735 are connected through electrical communication to the internal electronics of the base assembly. The user interface may also provide for a dial 745 to be placed on the front face of the base housing. The dial may have an embedded LED which will illuminate when the variable temperature blender is provided with power for operational functionality. The dial may also be rotated in either the clockwise or counterclockwise direction so that the user can cycle through different operational programs to selection the appropriate program desired by the user. When the correct program is selected, the dial may have a dial button 746 component on the front face of the dial that may be depressed to execute the selected operational program of choice.

Attached to the bottom of the base housing may be a plurality of pads 750. The plurality of pads allow the variable temperature blender to contact and be stabilized on a surface. The plurality of pads may be made of a rubber material or the like so that vibrations caused by operation of the variable temperature blender will not cause the base assembly to move from its placed position on the surface.

Figure 8:
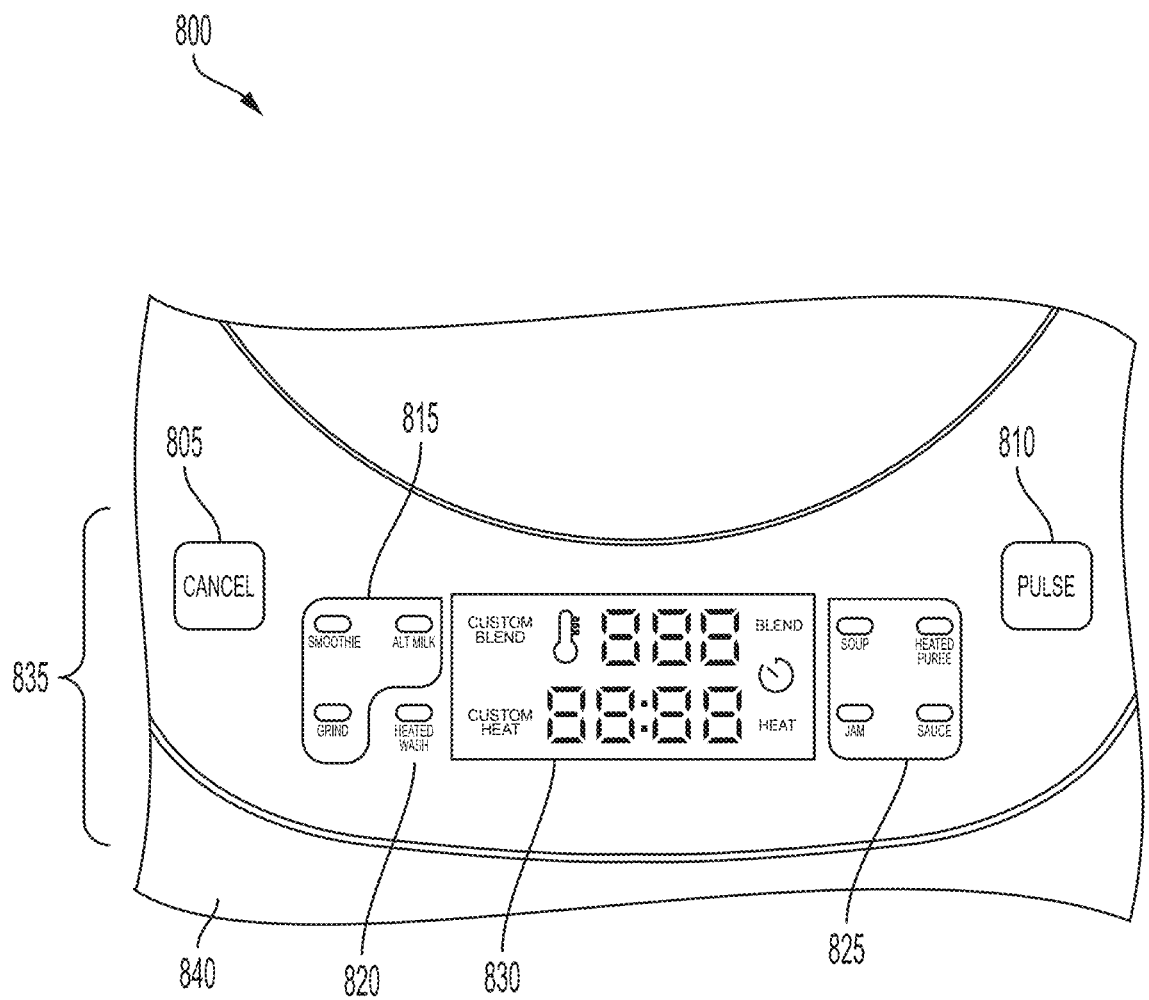
FIG. 8 shows a perspective view of a user-interface of the base assembly of the variable temperature blender in an embodiment of the disclosure.

As seen in FIG. 8, an embodiment 800 of buttons 805 and 810, mode indicators 815, 820 and 825, and a display screen 830 of a user interface 835 (aka 735) of a cover plate 840 (aka 740) having the user interface 835 that may be affixed to the top of the base assembly (715) is viewed. The user interface 835 has a cancel button 805 and a pulse button 810 at each end of the user interface 835. Each the cancel button 805 and the pulse button 810 may depress into a respective button position (e.g., 736 as shown in FIG. 7). The pulse button 810 allows the user to activate the variable temperature blender for standalone blending without the use of a pre-programmed operational cycle so long as safe operational conditions are met. The cancel button 805 allows the user to cancel operation of a selected mode of operation after the selection has been made by a user.

On the left side of the user interface 835, indicators 815 a plurality of non-heated operational modes are present. This plurality of non-heated operational modes are grouped together by a non-heated mode boundary line such as a blue line encircling the plurality of non-heated operational modes. When any saved operational mode of the variable temperature blender is selected, a light emitting diode (LED) above a description of the non-heated operational mode illuminates to notify the user of the mode of operation to be performed by the variable temperature blender. One of the plurality of non-heated operational modes is a smoothie mode. The smoothie mode operates the variable temperature blender at a predetermined program of speeds that may be used to blend smooth frozen smoothies, milk shakes, granata, margaritas, fruit based sorbets, snow cones, or the like, for the user and guests. Another of the plurality of non-heated operational modes is a alt milk mode. The alt milk mode operates the variable temperature blender at a predetermined program of speeds to make alternative milks from food products (almond milk, cashew milk, pistachio milk, etc.), oat milks, rice milks, or the like, for the user and guests. Another of the plurality of non-heated operational modes is a grinding mode. The grinding mode operates the variable temperature blender at a predetermined program of speeds to break down and chop food ingredients to make nut butters (cashew, almond, peanut, soy, pistachio, etc.), seed butters (sunflower, pumpkin, sesame, etc.), bean and legume flours (black bean, lentil, etc.), grinding spices, coffee, flours (wheat, nut flower, etc.), pasta dough, vegan parmesan, dried fruits (dates, raisins, etc.), or the like, for the user and guests. Also present on the left side of the user interface is an indicator 820 of a heated wash mode. The heated wash mode utilizes the heating element of the vessel assembly in its functionality. The heated wash mode heats a set amount of water added to the blending vessel to a set temperature and rotates the blade assembly via the motor to clean both the blade assembly and the interior surface of the blending vessel.

On the right side of the user interface 835, indicators 825 of a plurality of heated operational modes are present. This plurality of heated operational modes are grouped together by a heated mode boundary line such as a red line encircling the plurality of heated operational modes. When any saved operational modes of the variable temperature blender are selected, a light emitting diode (LED) above a description of the heated operational mode illuminates to notify the user of the mode of operation to be performed by the variable temperature blender. One of the plurality of heated operational modes is a soup mode. The soup mode operates the variable temperature blender at a predetermined program of speeds and temperatures that may be used to heat and prepare pureed soups, pureed soups with additional food item add ins, or the like, for the user and guests. Another of the plurality of heated operational modes is a heated puree mode. The heated puree mode operates the variable temperature blender at a predetermined program of speeds and temperatures to cook and create warm food item purees such as baby food, veggie purees (parsnip, carrot, squash, etc.), apple sauce, or the like, for the user and guests. Another of the plurality of heated operational modes is a jam mode. The jam mode operates the variable temperature blender at a predetermined program of speeds and temperatures to cook and create fruit jams, vegetable jams, compotes, coulis, extracts, simple syrups, or the like, for the user and guests. Also present as one of the plurality of heated operational modes is a cream sauce mode. The cream sauce mode operates the variable temperature blender at a predetermined program of speeds and temperatures to cook and create custards, puddings, crème anglaise, ice cream bases, roux-bases sauces, gravies, hollandaise sauce, butter sauce (beurre blanc), cornstarch-based sauces (Asian cooking sauces, barbecue sauce, etc.), or the like, for the user and guests.

Although not shown on the user interface, custom blend modes may be programed into the variable temperature blender and selected by the user. Additionally, there may be available operational modes for creating mayonnaise, vegan mayonnaise, simple syrups and infusions, pancake batter, crepes, salad dressings, juicing of fruit, dough preparation, and pate coux. It is envisioned that these possible mode may have a similar configurations on the user interface or can be programed as a custom blend mode stored by the internal electronics of the base assembly.

In the middle of the user interface is a display screen 830 capable of communicating an operational characteristic of the variable temperature blender to the user during operation. The custom blend setting is a setting that can be stored within the internal electronics and is the base setting of operation when the variable temperature blender is first turned on. From here, the user can select the pulse button to cause rotation of the blade assembly and blend the food items within the vessel assembly. The custom heat setting may be a setting where a stored heating and blending program is saved within the internal electronics of the base assembly and accessible by the user. In the custom heat setting and unlike the custom blend setting, the heating element of the vessel assembly is also activated in the preparation of the food items within the blending vessel. The blend icon will illuminate any time the blade assembly is in motion within the blending vessel. The heat icon will illuminate when the heating element is active within the vessel assembly. The thermometer icon will illuminate when the temperature of the food items, as provided by the temperature sensor, reaches or exceeds 140° F. (60° C.). At or above this temperature, the food items of the blending vessel are hot enough to scald and cause injury to the user. A speed/temperature display is also present. When in use with either the custom heat setting or one of the plurality of heated operational mode, the temperature as determined by the temperature sensor of the vessel assembly will be displayed. When the variable temperature blender is in use in either the custom blend setting or one of the plurality of non-heated operational modes, the speed of the motor driving the blade assembly of the vessel assembly will be displayed. The time display will show the time in the custom blend setting or one of the plurality of non-heated operational modes. The time display will only show the time in the custom heat setting or one of the plurality of heated operational modes when the temperature required for operation of these modes has been achieved by the heating element of the vessel assembly and confirmed by the temperature sensor. During waiting and preheating periods, the time display may enter an animation mode of an unlit segment moving in a clockwise direction around the display to indicate that the variable temperature blender is working to obtain and confirm the optimal operational conditions for the selected mode.

Figure 9:
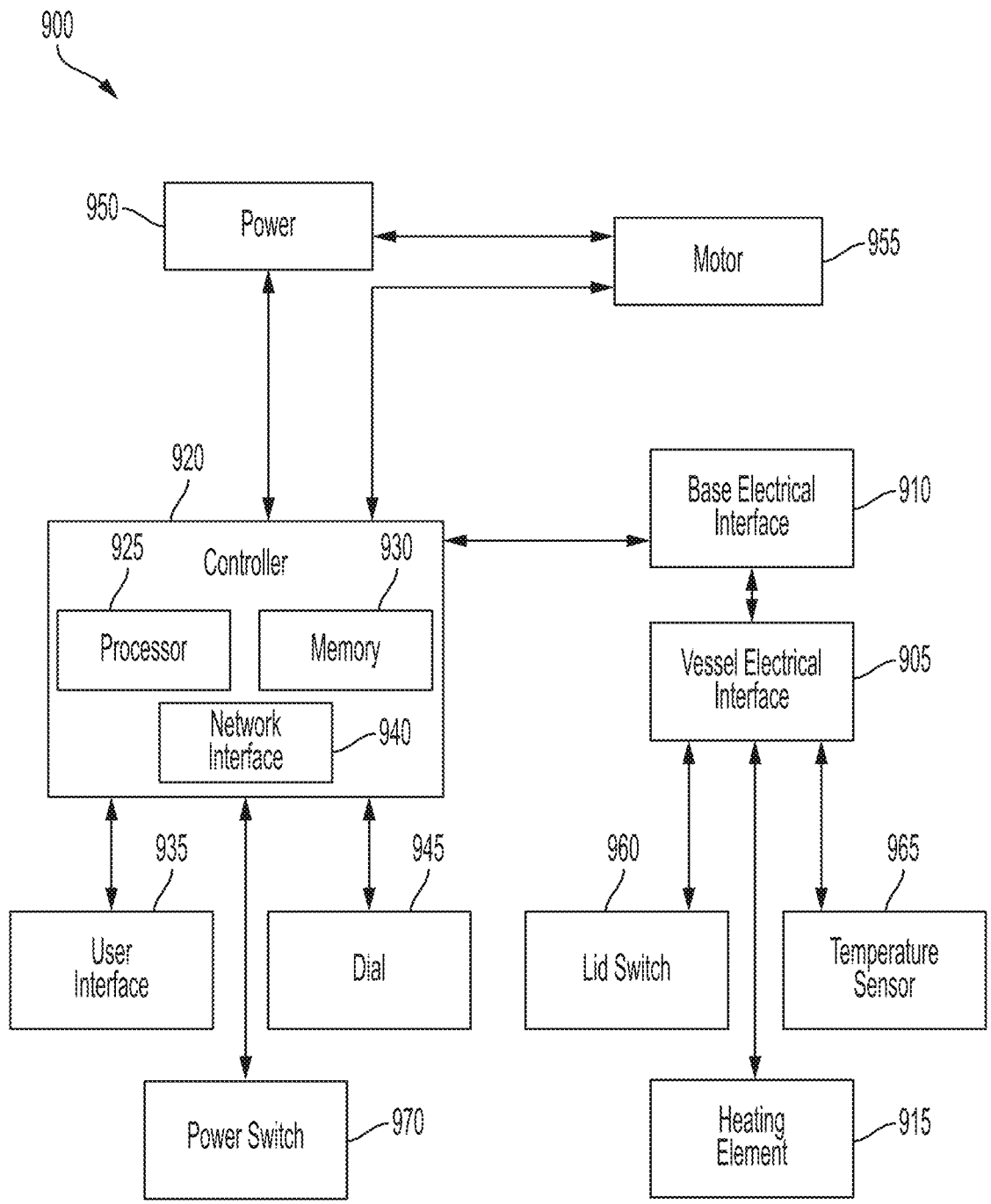
FIG. 9 shows a schematic view of interconnected electrical components of the variable temperature blender in an embodiment of the disclosure.

Turning now to FIG. 9, an embodiment 900 of the electronic interaction between components of the variable temperature blender (100) is viewed, showing interactions between components such as a vessel electrical interface 905 (aka 405), a base electrical interface 910 (aka 710), and a heating element 915 (aka 415, 615). The electronic circuitry and interconnections for data communication between components of the variable temperature blender (100) may controlled by a controller 920 located within the interior of the base assembly (715). The controller may be a standalone microprocessor chip or a printed circuit board with multiple computer hardware components. The controller may include a processor 925, a memory 930, and a network interface 940. The processor, memory, and network interface can interconnected with each other in any of a variety of manners (e.g., via a bus, via a network, etc.).

The network interface 940 can provide an access point for the variable temperature blender (100) to an outside network. The network interface may take any suitable form for carrying out network interface functions, examples of which include an Ethernet interface, a serial bus interface (e.g., USB 3.0, etc.), a chipset, and antenna adapted to facilitate wireless communication, Bluetooth, near field communication, and/or any other interface that provides for wired and/or wireless communication. Other configurations are possible as well.

The outside network can be any suitable communication network or combination of communication networks, such as the Internet, wired and wireless telecommunication networks, etc. Through the outside network, the variable temperature blender can communicate either wired or wirelesses with personal electronic devices of users or outside computer system. Through these wired or wireless interconnections, it is possible for users to transmit software data packages to the controller. These data packages may include, but are not limited to, firmware updates to the hardware of the controller, new custom blend settings, or new custom heat settings, that can be operated by the variable temperature blender.

The processor 925 may comprise one or more processors such as general-purpose processors (e.g., a single-core or multi-core microprocessor), special-purpose processors (e.g., an application-specific integrated circuit or digital-signal processor), programmable-logic devices (e.g., a field programmable gate array), etc. that are suitable for carrying out the operations of the variable temperature blender described herein.

The memory 940 may comprise one or more non-transitory computer-readable storage mediums, such as volatile storage mediums (e.g., random access memory, registers, and/or cache) and/or non-volatile storage mediums (e.g., read-only memory, a hard-disk drive, a solid-state drive, flash memory, EEPROM, and/or an optical-storage device). The memory may also be integrated in whole or in part with other components of the controller. Further, the memory may be local to the processor, it should be understood that the memory (or portions of memory) could be remote from the processor, in which case the processor may access such remote memory through network interface (or some other network interface). Memory may store operational software programs or instructions that are executed by processor during operation of the variable temperature blender.

In the base assembly (715) of the variable temperature blender (100), power 950 from the power source enters through the power cord. That power is sent to each the motor 955 and controller 920 for operations of each of these components. The controller is in data communication with the motor to adjust the speed and on/off operation of the motor based on the selected mode of operation by the user. The controller is also in both data and power communication with the base electrical interface to provide power and data to the vessel electrical interface. The controller is also in data communication with the user interface 935 (aka 735, 835) to display the correct mode of operation, time, and temperature related data to the user after a mode of operation is selected. The dial 945 (aka 745) of the base assembly is also in communication with the controller. As the dial is rotated to select a mode of operation, the controller updates the user interface accordingly. When the dial button is depressed, the controller authorizes operation of the selected mode and commands the motor to being operations. In some instances, data commands will also be sent to the base electrical interface for communication to the necessary components of the vessel assembly. The power switch 970 is also in communication with the controller. When the power switch is placed in the on position, the controller allows both the user interface and the dial to function so that a user may select a mode of operation for the variable temperature blender.

The vessel electrical interface 905 (aka 405) communicates both with the controller 920 via the base electrical interface 910 and other electrical components of the vessel assembly (300). The vessel electrical interface passes both power and data to the appropriate component of the vessel assembly. The lid switch 960 (aka 338) of the vessel assembly (300) communicates a data signal to the controller via the vessel electrical interface indicating whether the lid assembly and the vessel assembly are properly mated together to allow for operation of the variable temperature blender. The temperature sensor 965 (aka 408, 608) communicates a data signal to the controller indicative of the temperature of a food item within the blending vessel in some modes of operation. The heating element 915 (aka 415, 615) is provided with power from the controller 920 and similar on/off data signals based on the mode of operation selected by the user.

As seen in FIGS. 10 to 19, a flowchart of various operational modes of the variable temperature blender (100) is described. There are certain program requirements for each of the operational modes. These program requirements include display requirements, process requirements, and user input requirements. The display requirements relate to the display of an icon and/or message that corresponds to functions/states of the blender. These icons/messages are displayed via the user interface (e.g., on the display screen of via dedicated icon/indicator). The messages may be an error (e.g., "ERR") message. Any time a heating element is on, the "HEAT" icon is required to be lit. Any time the motor is on, the "BLEND" icon is required to be lit. Any time the thermometer/temperature sensor reads a temperature above 140 degrees Fahrenheit, the "THERMOMETER" icon/light is required to stay lit. While heating, if the temperature reading reaches above 400 degrees Fahrenheit, all functions are stopped, and "ERR3" is displayed. If not thermometer readings are being acquired, all functions are stopped, and "ERR2" is displayed. If the thermometer readings are incorrect, all functions are stopped, and "ERR1" is displayed. The process requirements include aspects relating to how the blender functions. When temperatures are above 140 degrees Fahrenheit, the speed starts at a low speed and ramps up to a higher speed to prevent liquid splashing. The soup, jam and heated puree modes are set to account for high altitude conditions (e.g., temperature stalling at greater than 90 degrees Celsius for more than 90 seconds). The heating element and motor should not be on at the same time (e.g., preferably never on at the same time). The user input requirements relate to how the blender reacts to certain user inputs. A user pressing the cancel button at any point will turn off all functions and return to the custom blend mode. At any point after a cycle starts, the user can press the dial (aka wheel) button again to pause the cycle, and the display will blink while paused. If the lid is removed while the blender is in operation, the blender pauses until the lid is replaced and the user presses the dial button to resume.

Figure 10A:
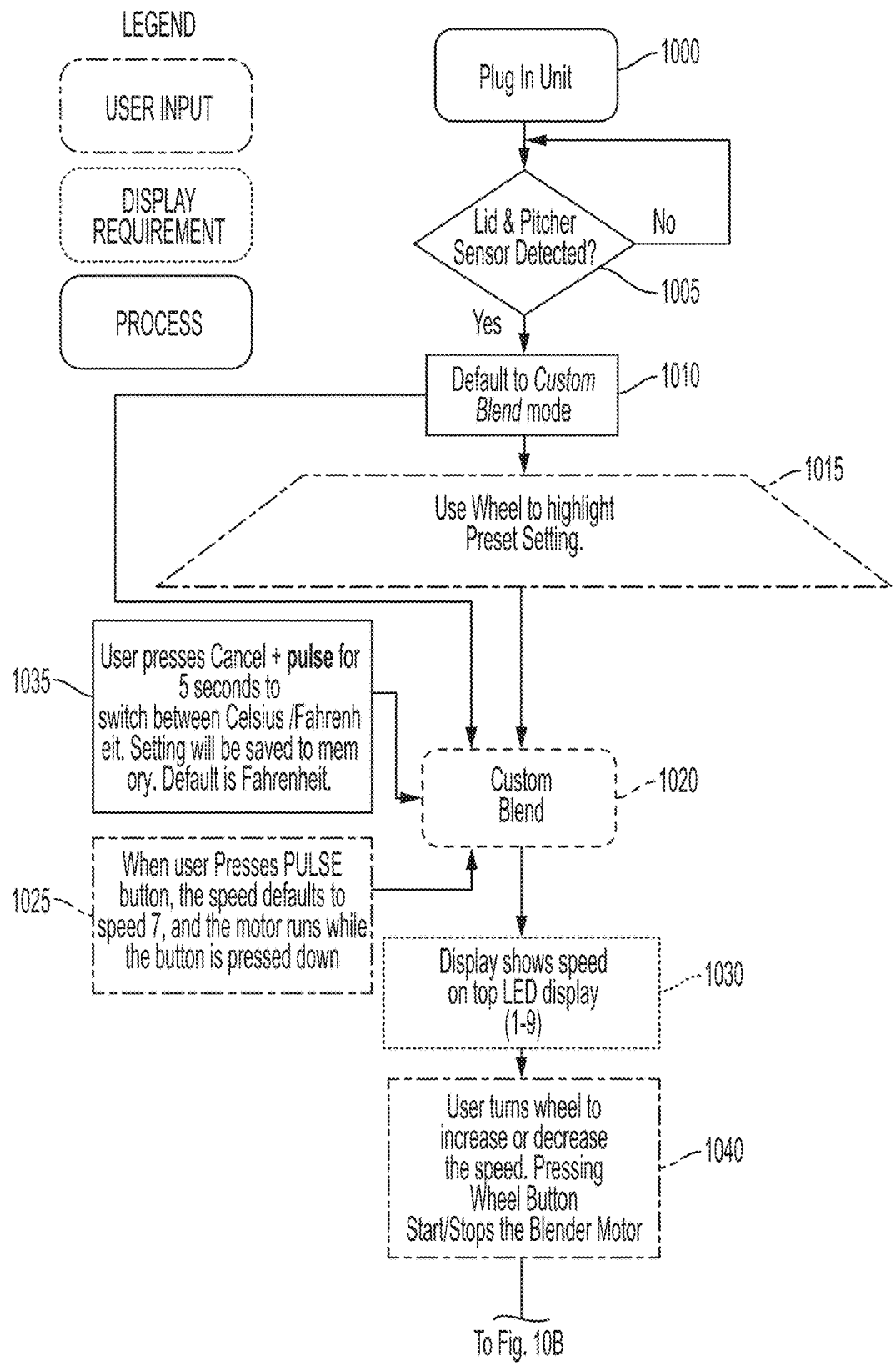
FIGS. 10A and 10B show a flowchart of a custom blend operational mode for the variable temperature blender in an embodiment of the disclosure.

Before any operational mode can be selected by a user, the variable temperature blender must first be connected to a power source by a power cable. As shown in FIG. 10A, once the unit is plugged in at step 1000, the lid switch data signal is verified at step 1005 by the controller to determine whether the lid assembly and the vessel assembly are mated in a proper configuration for operation of a blending mode. If the lid switch data signal is not confirmed, then the variable temperature blender will not operate (and step 1005 is performed again). Once the lid switch data signal is confirmed, then the variable temperature blender defaults to the custom blend mode at step 1010. From here, at step 1015, the user has the additional option to rotate the dial (aka wheel) of the base assembly to select alternative modes of operation. These steps 1000, 1005, 1010 and 1015 are performed at the beginning of each use/mode of the blender, regardless of the desired mode, as shown in FIGS. 10A, 11A, 12A, 13A, 14A, 15A, 16A, 17A, 18A and 19A. The functional blocks shown in FIGS. 10-19 have different line-styles as illustrated in the legend shown in each of FIGS. 10A, 11A . . . 19A, where long-dashed lines represent the mode, alternating long/short-dashed lines represent a user input, short-dashed lines represent a display requirement, and solid lines represent a process.

Figure 10B:
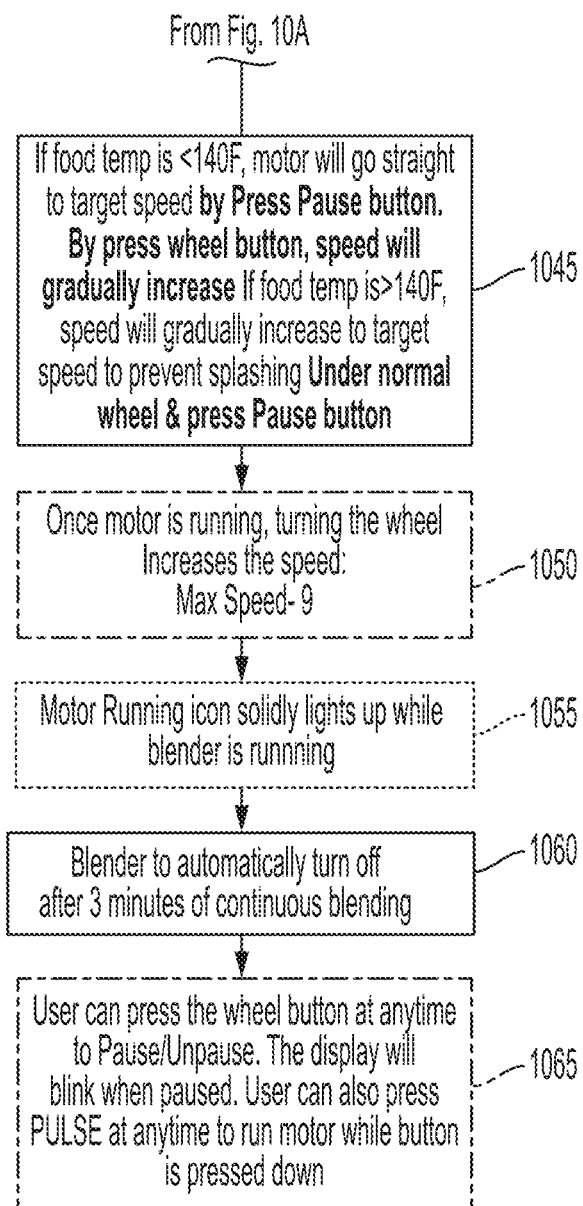

Turning back to FIG. 10A, if the custom blend setting at step 1020 is selected, at step 1025, the custom blend setting LED is lit solid to notify the user of the selection. At step 1030, the speed/temperature display shows the speed of the blade assembly when the variable temperature blender is in operation. If the user wishes to change the measurement unit for the temperature of the speed/temperature display, the user can, at step 1035, manually depress and hold the pulse and cancel buttons to change the measurement unit from Fahrenheit to Celsius. Next, at step 1040, the user may depress the dial button to start operation for the motor and in turn the blade assembly within the blending vessel. Turning to FIG. 10B, at step 1045, determinations are made relative to temperature and motor speed. For example, if the motor temperature is less than 140 degrees Fahrenheit, the motor will default to a first speed, whereas is the temperature is greater than or equal to 140 degrees Fahrenheit, the motor will slowly ramp up to speed to prevent splashing. While the variable temperature blender is in operation, the user at step 1050 may rotate the dial to increase or decrease the speed setting of the motor. During this time, at step 1055, a motor running icon lights up while the blender is running (e.g., a blade icon of the display will illuminate to notify the user that the blade assembly is in motion). As a safety precaution, the controller is preprogramed (as shown at step 1060) to automatically turn off and cease the operational mode after a certain time interval (e.g., ninety seconds, three minutes, etc.) of continuous blending has passed. Afterwards, at step 1065, when the motor is not running, the user may select a different mode of operation of their choosing.

Figure 11A:
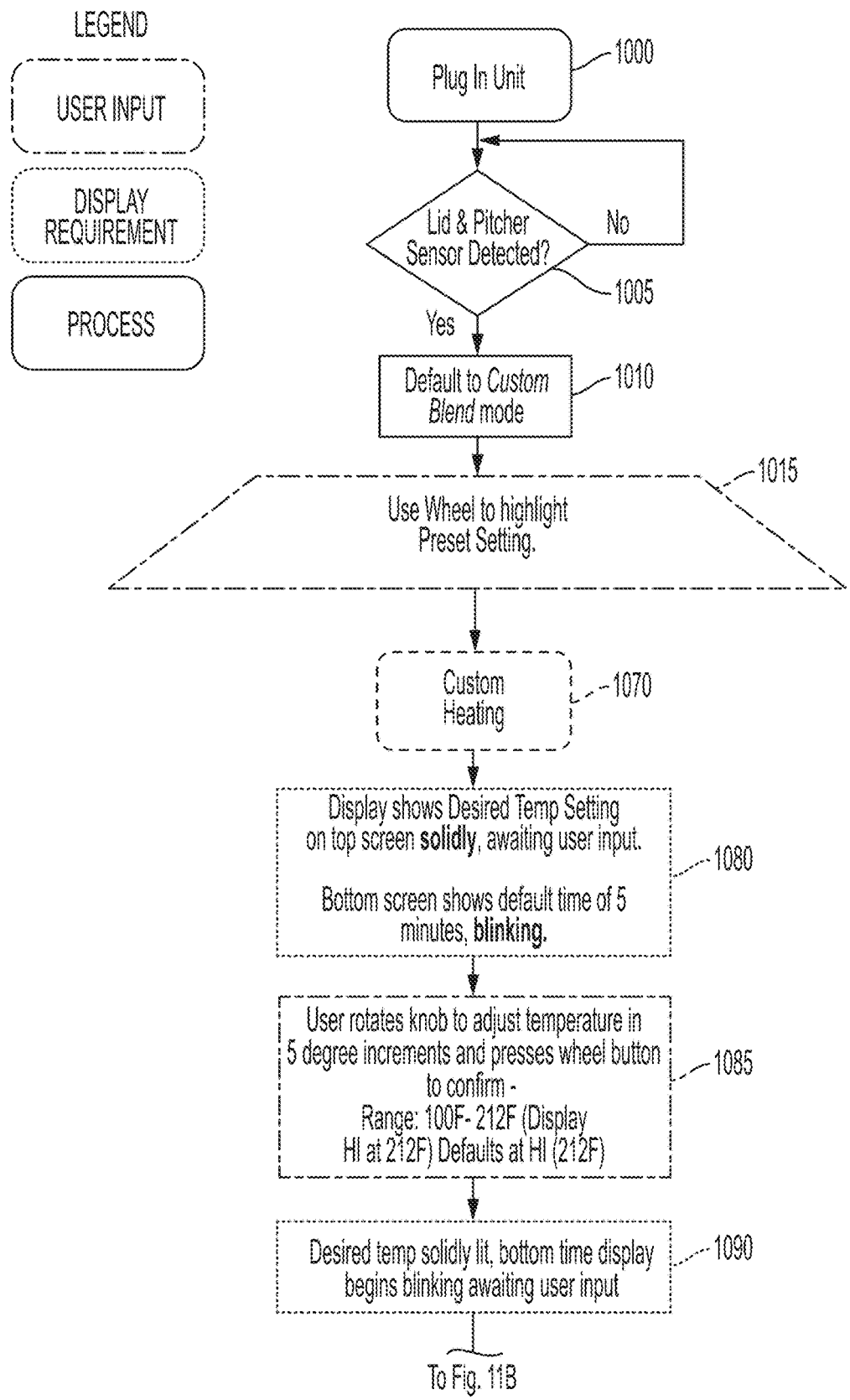
FIGS. 11A and 11B show a flowchart of a custom heating operational mode for the variable temperature blender in an embodiment of the disclosure.
Figure 11B:
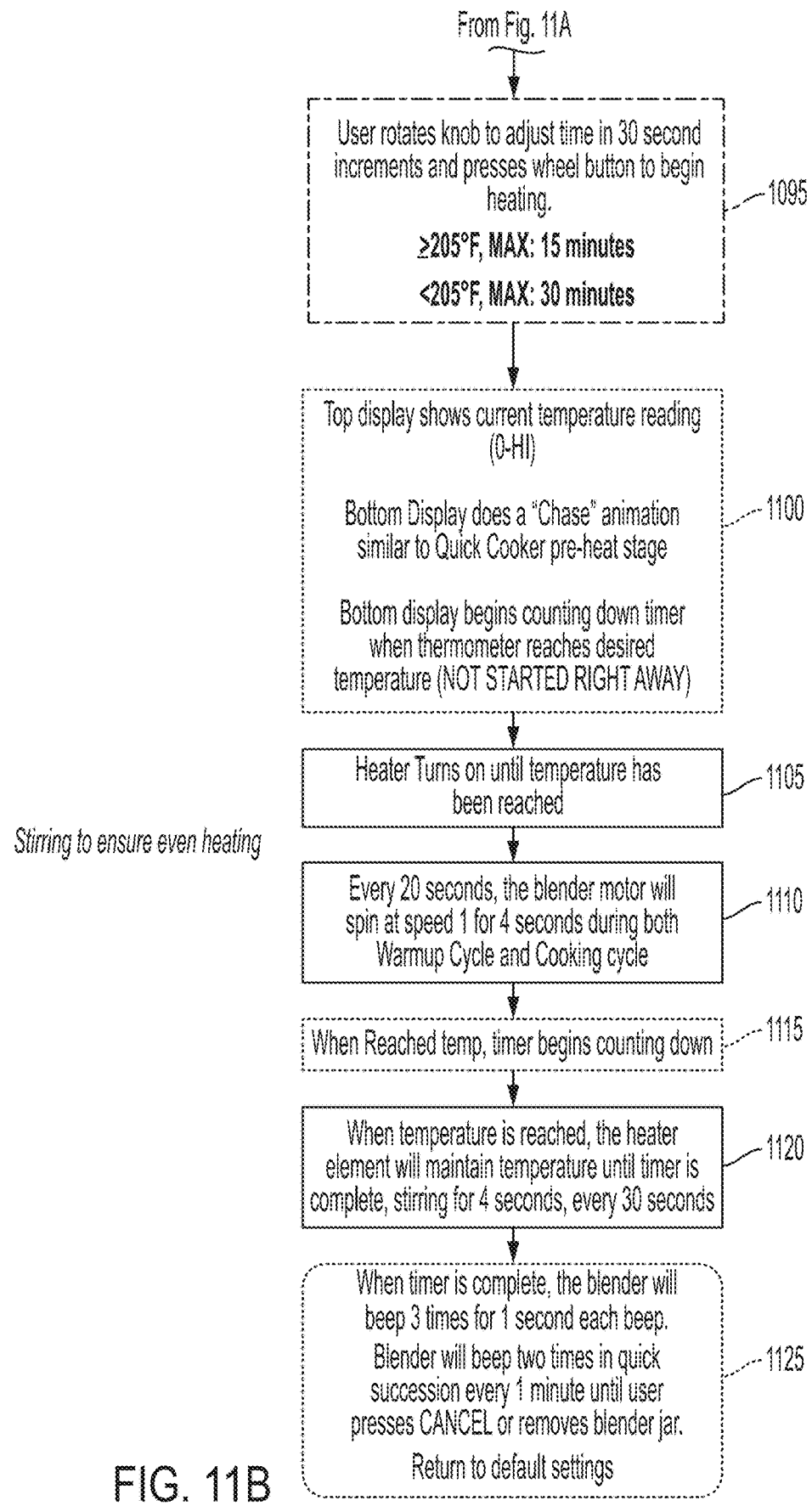

In FIGS. 11A and 11B, if the custom heating setting is selected at step 1070, the custom heating setting LED is lit solid to notify the user of the selection. At step 1080, the speed/temperature display shows the desired temperature of operation blinking on the display and awaiting user input. The time display may show a default time period of five minutes and will be solidly lit. At step 1085, the user can then rotate the dial to adjust the desired temperature in five degree increments. The temperature of the variable temperature blender can be adjusted between a range of 100° F. to 212° F. Once the desired temperature is selected, the user can depress the dial button to confirm the selection. Next, at step 1090, the speed/temperature display is solidly lit as the desired temperature was chosen. From there, the time display will being to blink awaiting user input. At step 1095, the user can the rotate the dial to adjust a desired time in thirty second increments. The default time may be five minutes while the max selectable time may be sixty minutes. Once a time is selected by the user, the user can press the dial button a second time to confirm the selection. The variable temperature blender then enters a preheating mode where the speed/temperature display shows, at step 1100, the current temperature read by the temperature sensor while illuminating the thermostat icon into a blinking state of the user interface. The time display performs the earlier described "chase" animation to indicate pre-heating of the variable temperature blender. When the desired temperature is reached, the time display begins a countdown from the selected time. Once the user, at step 1105, selects the desired time the heating element turns on via the controller. At step 1110, every thirty seconds the motor will operate at a low speed, for example speed one, for five seconds to stir the contents of the blending vessel. At step 1115, when the desired temperature is reached, the heating icon will stop blinking and be solidly lit to note that the temperature is reached and the variable temperature blender is maintaining the temperature as the timer countdown continues. At step 1120, when the temperature is reached, the heater element will maintain the temperature until the timer is complete. At step 1125, when the timer is finished, the variable temperature blender may audibly beep multiple times. The variable temperature blender can then beep two additional times in quick succession every minute until the user depresses the cancel button or removes the vessel assembly from the base assembly.

Figure 12A:
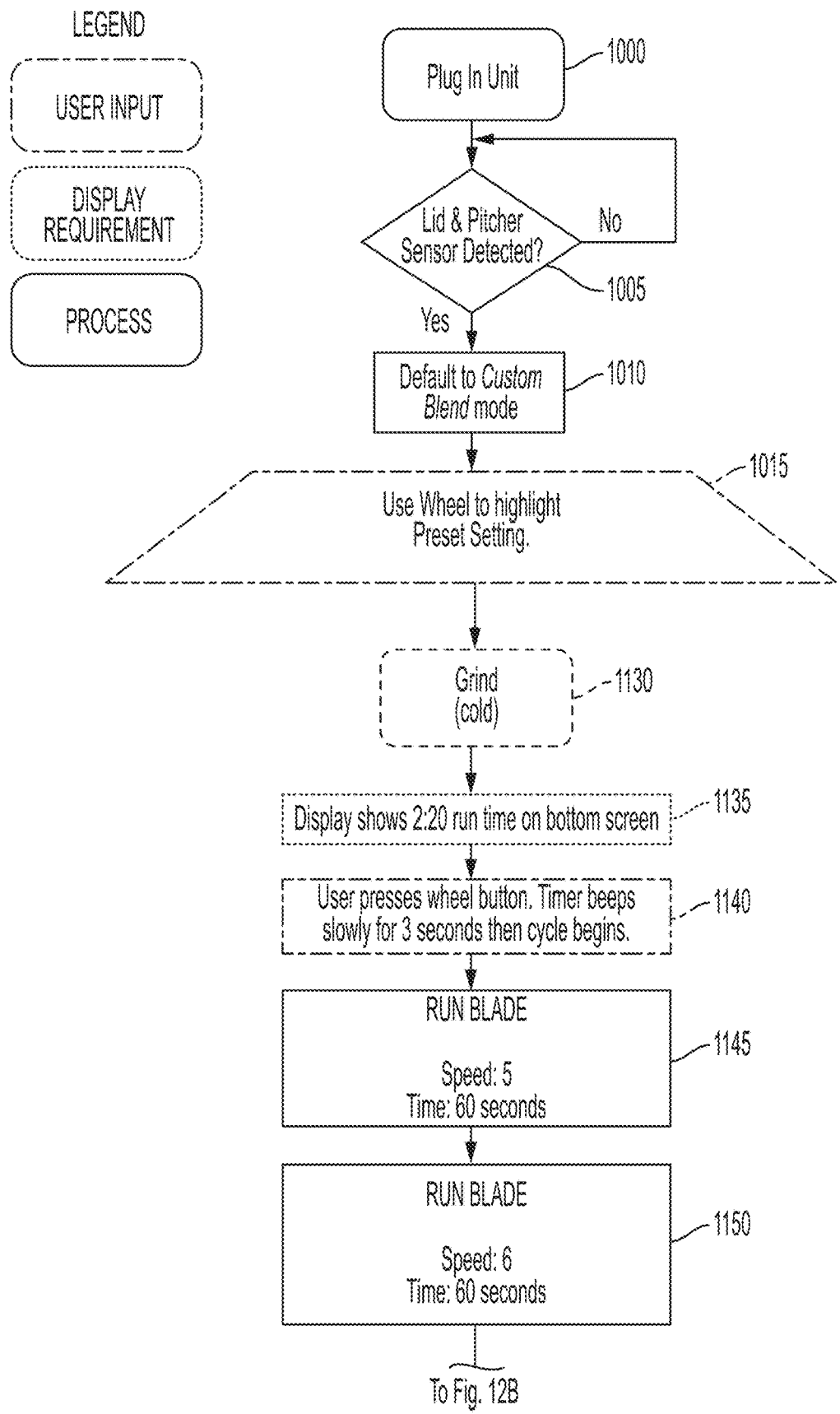
FIGS. 12A and 12B show a flowchart of a grind operational mode for the variable temperature blender in an embodiment of the disclosure.
Figure 12B:
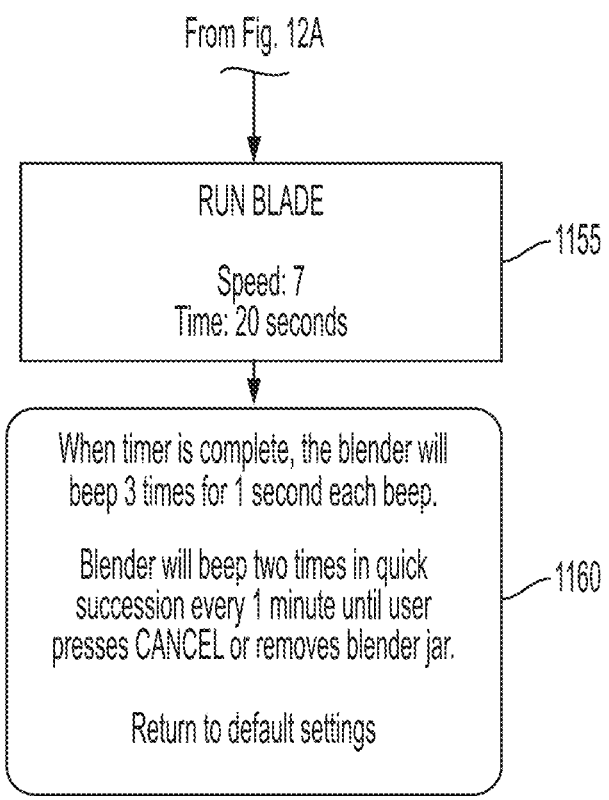

In FIGS. 12A and 12B, if the grinding mode is selected at step 1130, the grinding mode LED is lit solid to notify the user of the selection. At step 1135, the time display shows a time (e.g., 2:20) (although a speed/temperature, such as a speed (e.g., of 24000 RPM, speed nine) can be displayed). At step 1140, the user can then depress the dial button to start the grinding mode cycle. The variable temperature blender can then beep slowly for three seconds signifying the beginning for the grinding mode cycle. At step 1145, to complete the grinding mode, the blade assembly first runs at a first speed (e.g., speed 5 for 60 seconds, or speed three (3000 RPMs) for a certain amount of time (e.g., two seconds, thirty seconds, etc.)). At step 1150, the blade assembly then runs at another speed for another amount of time (e.g., speed six for sixty seconds, or speed three for thirty seconds, or speed nine (24000 RPMs) for twenty seconds). Afterwards, at step 1155, the blade assembly runs at yet another speed for yet another amount of time (e.g., speed seven for twenty seconds, or speed nine for forty seconds, or speed five (10000 RPMs) for twenty seconds followed by running at speed three (3000 RPMs) for twenty seconds). The blade assembly can then optionally stop operation for ten seconds to allow the food items some time to resettle within the blending vessel. Next, the blade assembly may run at speed three (3000 RPMs) for two seconds and then at speed nine (24000 RPMs) for twenty seconds. Finally, the blade assembly may run at speed five (10000 RPMs) for twenty seconds followed by a twenty second run at speed three (3000 RPMs). At step 1160, when the timer is finished, the variable temperature blender may audibly beep multiple times. The variable temperature blender can then beep two additional times in quick succession every minute until the user depresses the cancel button or removes the vessel assembly from the base assembly.

Figure 13A:
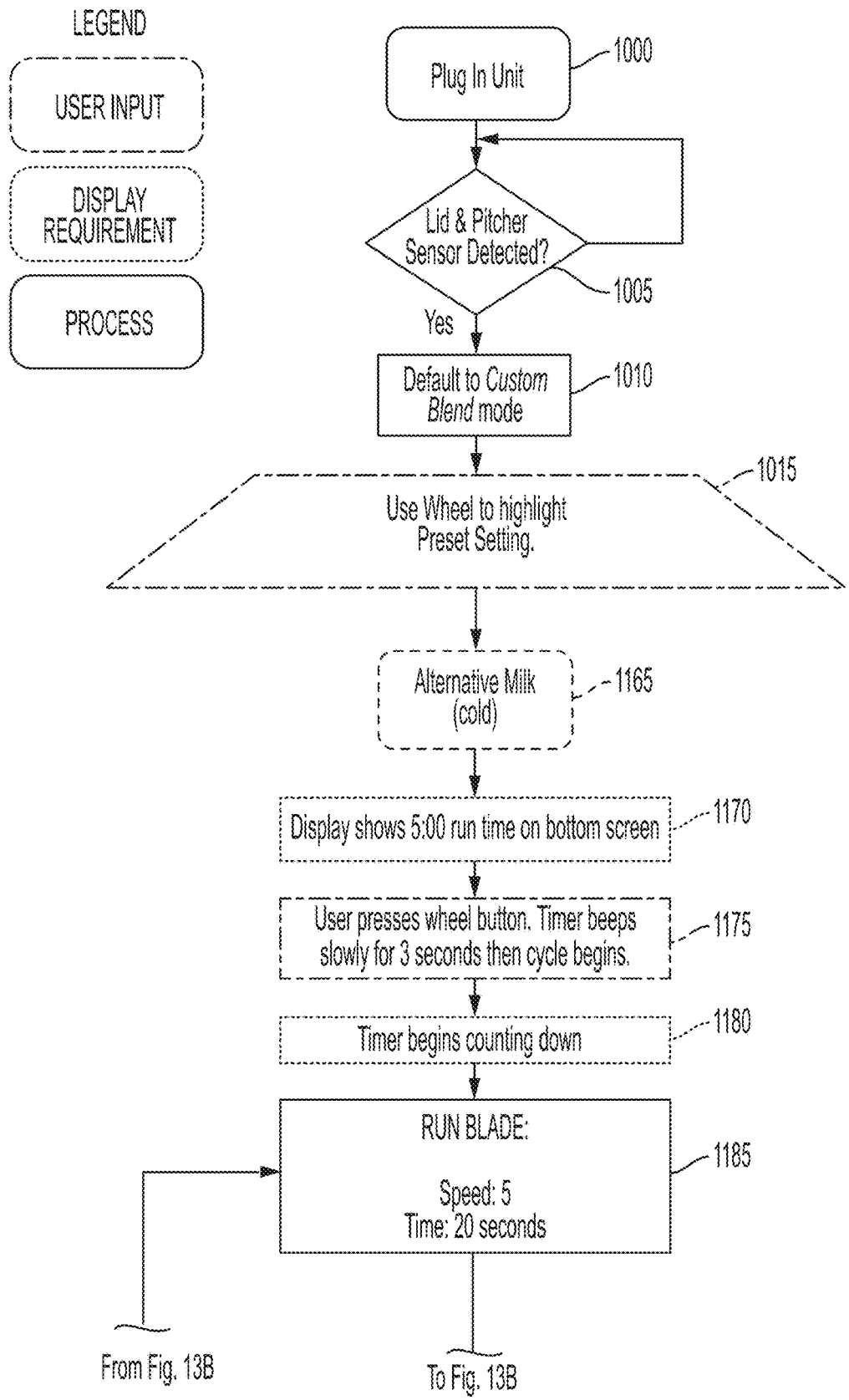
FIGS. 13A and 13B show a flowchart of an alternative milk operational mode for the variable temperature blender in an embodiment of the disclosure.
Figure 13B:
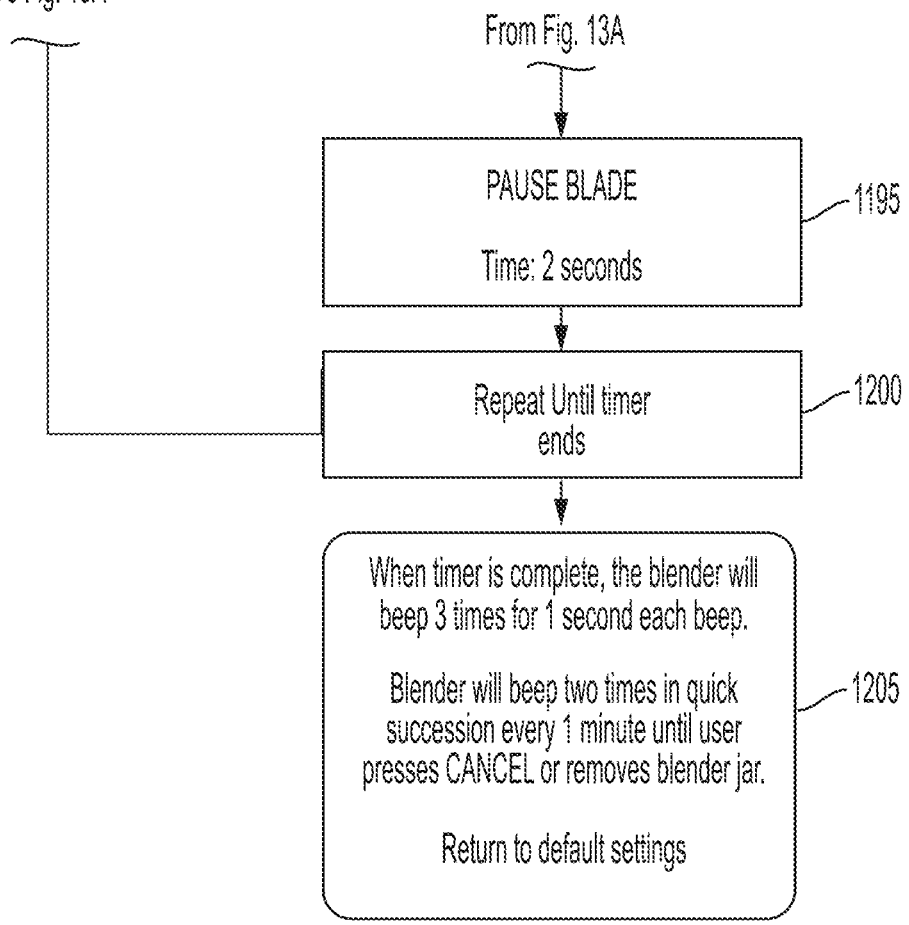

In FIGS. 13A and 13B, if the alternative ("alt") milk mode is selected at step 1165, the alt milk mode LED is lit solid to notify the user of the selection. At step 1170, the speed/temperature display shows speed five (10000 RPMs) and the time display shows a run time of five minutes. The user can then depress the dial button to start the alt milk mode cycle at step 1175. The variable temperature blender can then beep slowly for three seconds signifying the beginning for the alt milk mode cycle. At step 1180 the timer begins counting down. First, at step 1185, the blade assembly runs at speed 5 (10000 RPMs) for twenty seconds. Then at step 1195 the blade assembly pauses operation for two seconds to allow the food items in the blending vessel time to settle. This process is, at step 1200, repeated a certain amount of times (e.g., fourteen times) to complete the alt milk mode cycle. At step 1205, when the timer is finished, the variable temperature blender may audibly beep multiple times. The variable temperature blender can then beep two additional times in quick succession every minute until the user depresses the cancel button or removes the vessel assembly from the base assembly.

Figure 14A:
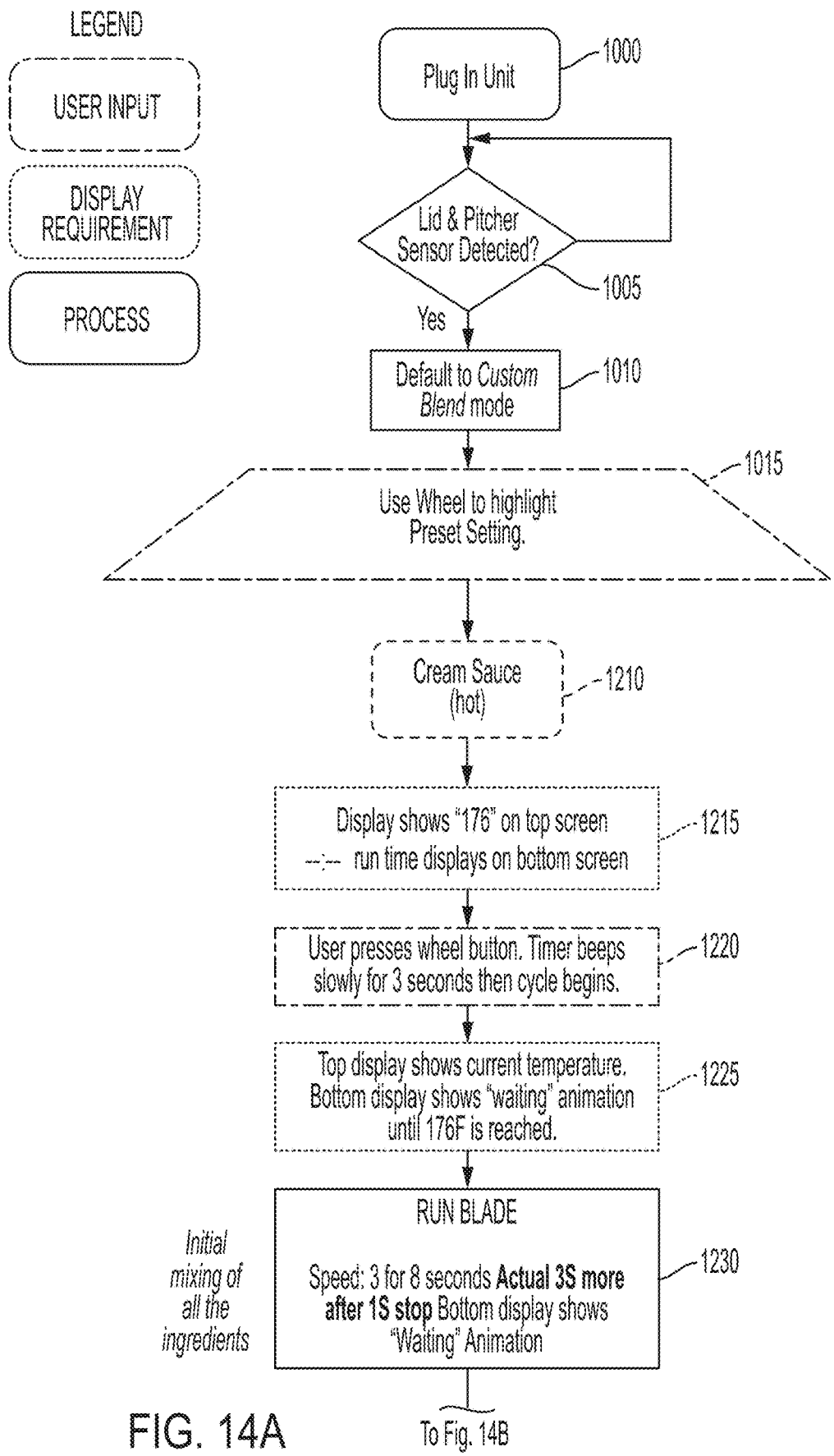
FIGS. 14A, 14B and 14C show a flowchart of a cream sauce operational mode for the variable temperature blender in an embodiment of the disclosure.
Figure 14B:
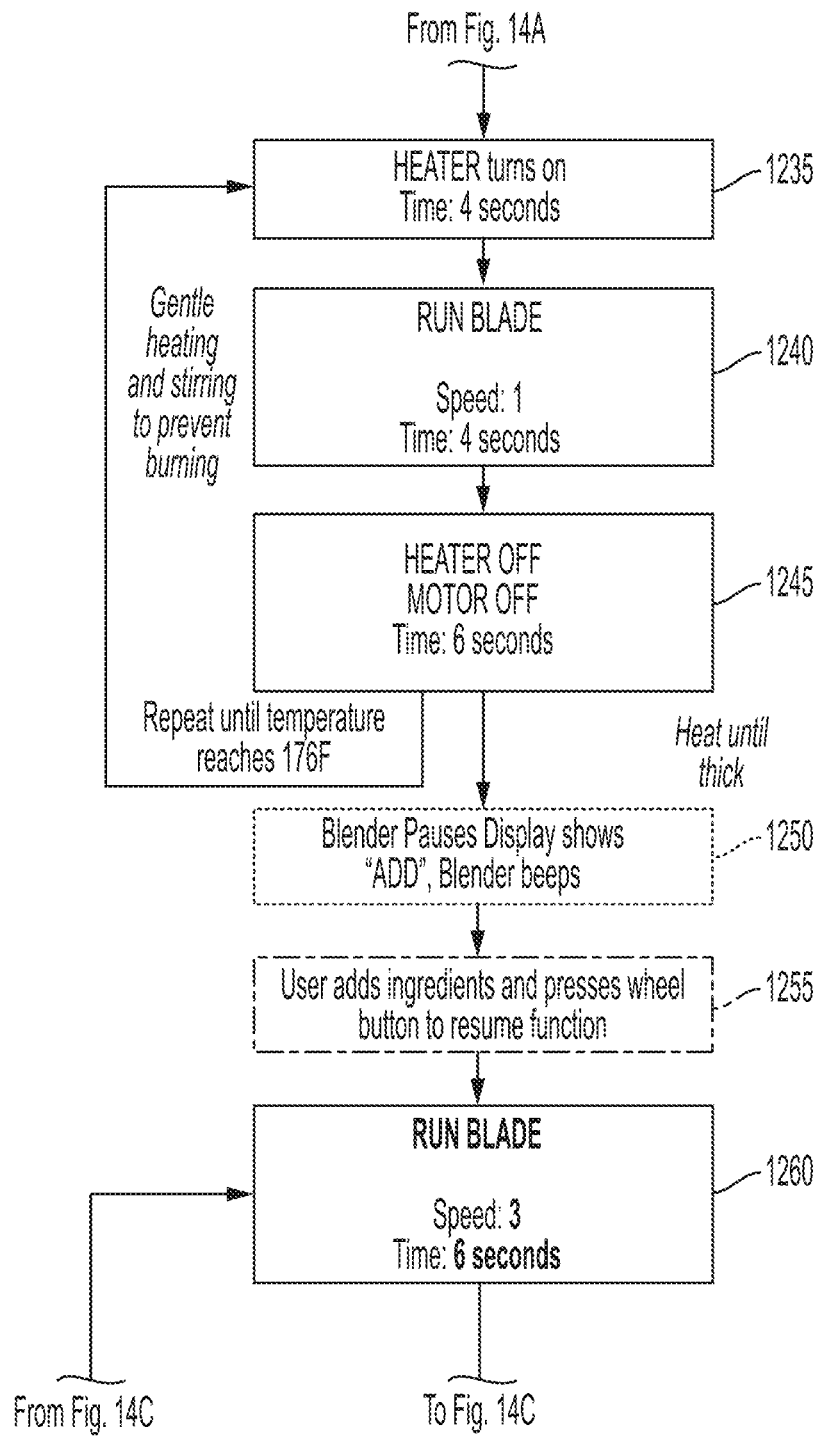
Figure 14C:
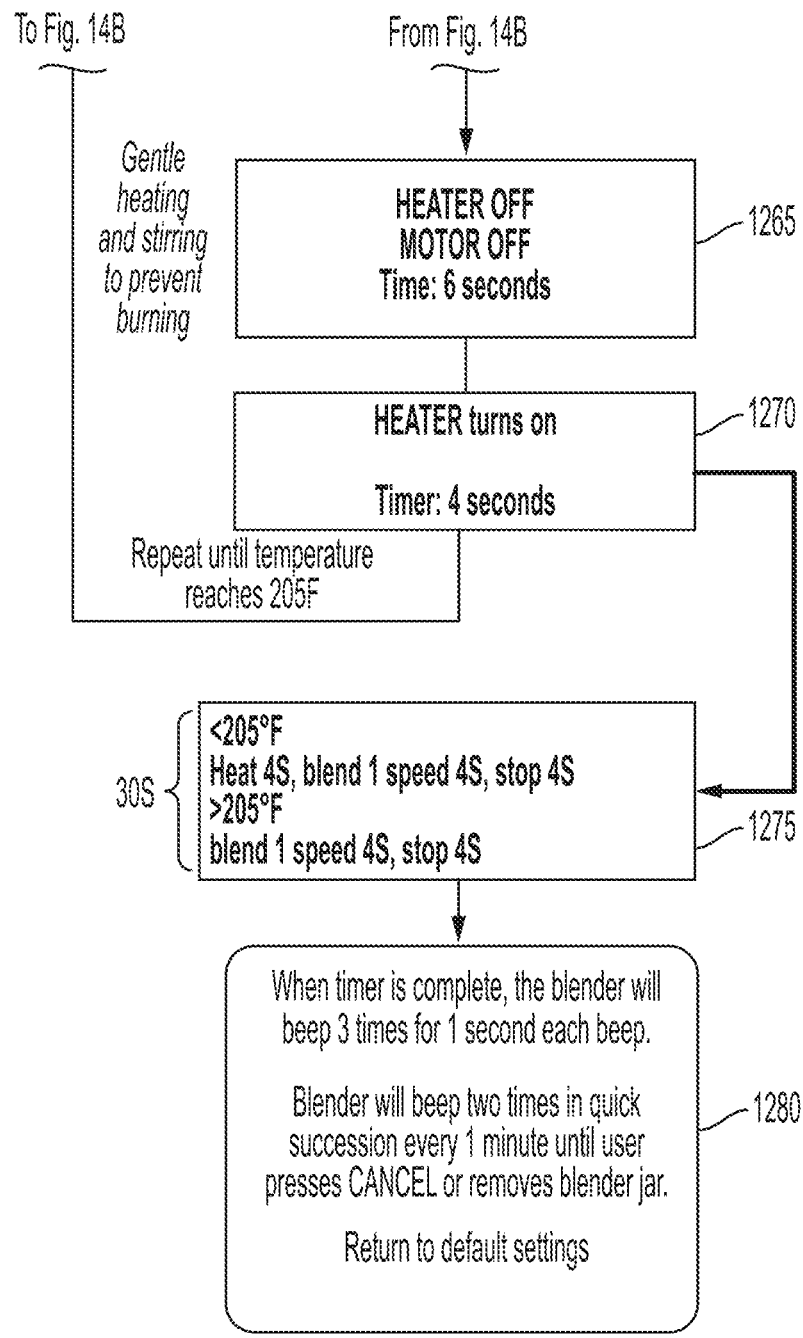

In FIGS. 14A to 14C, if the cream sauce mode, or heated sauce mode, is selected at step 1210, the cream sauce mode LED is lit solid to notify the user of the selection. At step 1215, the speed/temperature display shows a "176" and the time display shows a "-". This is because the temperature, speed, and time needed to complete the cooking process of the cream sauce varies significantly during the mode's operation. At step 1220, the user can then depress the dial button to start the cream sauce mode cycle. The variable temperature blender can then beep slowly for three seconds signifying the beginning for the cream sauce mode cycle. After the cream sauce mode is initialized, at step 1225, the speed/temperature display shows the current temperature of the food items in a blinking fashion. The time display communicates the "waiting" animation described above until the food items reach a temperature of 176° F. Next, at step 1230, the blade assembly runs at speed three for eight seconds and may include extra time (e.g., three seconds more, after a one second stop), and time/bottom display may show a "waiting" animation (or the blade assembly can alternatively run gradually through the speed settings (e.g., one through seven (100 RPMS-19000 RPMS, or one through five for eight seconds)) to initially blend/mix all of the food items. At step 1235, the heating element turns on and off in certain intervals (e.g., every four seconds, three times for heat modulation so the food does not burn). For example, the heating assembly continues to heat the food items until a temperature of 176° F. is reached. Heat can be applied (e.g., at 140° F.) for at least fifteen seconds to allow food items, such as eggs which are a common ingredient in cream sauces, the ability to thicken. Next, at step 1240, the blade assembly runs at speed one (100 RPMS) for a certain amount of seconds (e.g., four to five seconds), stirring to prevent burning until a temperature (e.g., 176° F.) is reached, where the display may remain as "-". At step 1245, the heating element and motor are turned of for a duration of time (e.g., six seconds), allowing the food item to thicken. At step 1250, the display indicates "ADD" while the blender is in a paused state, and beeps to alert the user. At step 1255, the user adds additional ingredients (if necessary) and operates the dial button to resume the mode. At step 1260, the blade assembly is run (e.g., at speed three for six seconds). At step 1265, the heating element and motor are turned off (e.g., for six seconds). This gentle heating and stirring prevents burning. At step 1270, the heating element turns on (e.g., for four seconds), and these steps 1260, 1265 and 1270 are repeated until the temperature reaches 205° F. At step 1275, determinations are made depending on if the temperature is less than or greater than 205° F. If less than 205° F., heating can be performed for additional time (e.g., four seconds), then blending can resume (e.g. at speed one for four seconds), and then stopped for a certain duration (e.g., four seconds). These processes can be grouped together in a time period such as thirty seconds. If greater than 205° F., blending can resume (e.g. at speed one for four seconds), and then stopped for a certain duration (e.g., four seconds). These processes can be grouped together in a time period such as thirty seconds. At step 1280, when the timer is finished, the variable temperature blender may audibly beep multiple times. The variable temperature blender can then beep two additional times in quick succession every minute until the user depresses the cancel button or removes the vessel assembly from the base assembly.

Figure 15A:
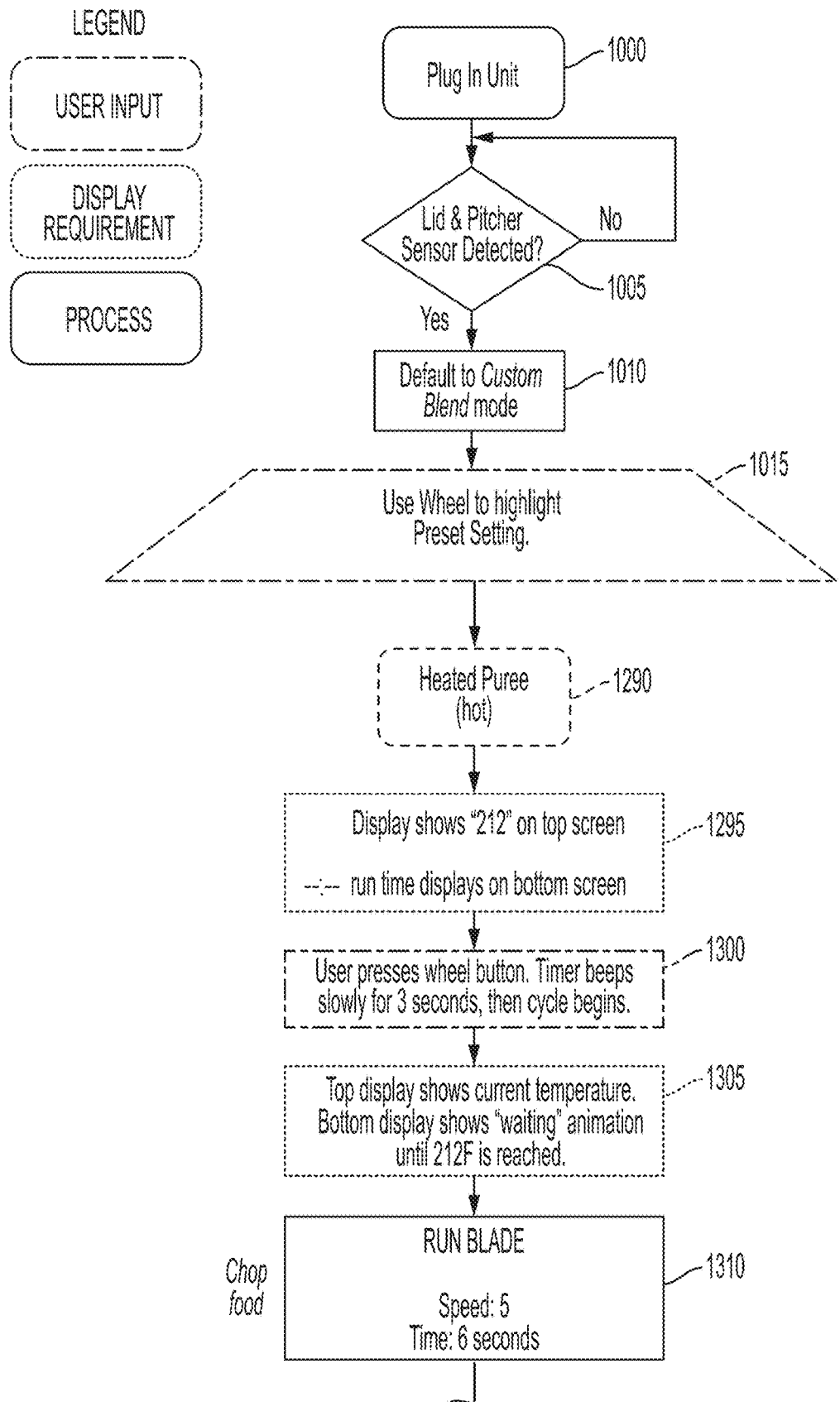
FIGS. 15A and 15B show a flowchart of a heated puree operational mode for the variable temperature blender in an embodiment of the disclosure.
Figure 15B:
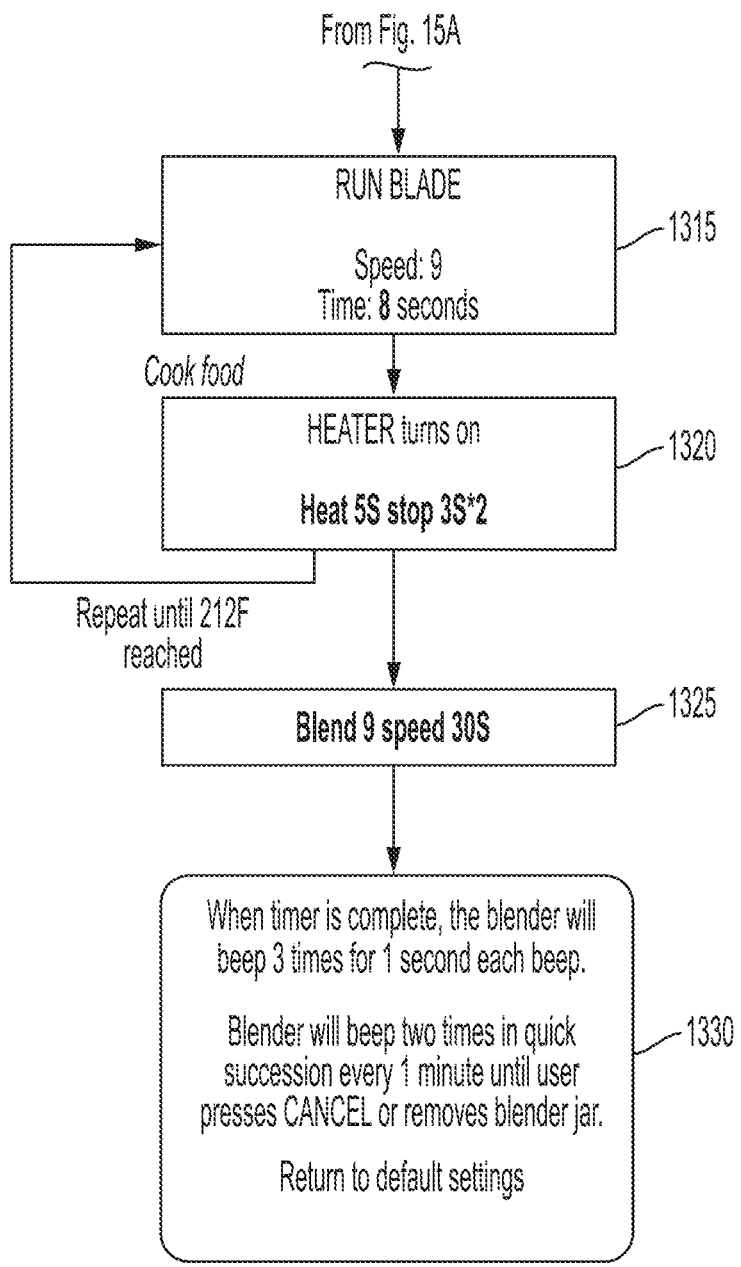

In FIGS. 15A to 15B, if the heated puree mode is selected at step 1290, the heated puree mode LED is lit solid to notify the user of the selection. At step 1295, the speed/temperature display shows a "212" and the time display shows a "- -:- -".

This is because the temperature, speed, and time needed to complete the cooking process of the heated puree varies significantly during the mode's operation. The user can then depress the dial button to start the heated puree mode cycle in step 1300. The variable temperature blender can then beep slowly for three seconds signifying the beginning for the heated puree mode cycle. After the heated puree mode is initialized, at step 1305 the speed/temperature display shows the current temperature of the food items in a blinking fashion. The time display communicates the "waiting" animation described above until the food items reach a temperature of 212° F. At step 1310, blending can occur at a certain speed for a certain amount of time (e.g., speed five for six seconds) to chop any food items. Next, at step 1315, the blade assembly runs at speed nine (24000 RPMs) for approximately eight seconds. This starts the food cooking process. After this blade run is completed, the heating element, in step 1320, activates for approximately five seconds, followed by a brief pause, and then reactivates for three more seconds. This heating cycle is repeated twice. This cycle of steps 1315 and 1320 is repeated until the temperature sensor reports that the food items have reached 212° F. or boiling. The heating element cooks the food items while running the blade assembly chops the food items for the puree. At step 1325, once boiling or 212° F. is reached, the blade assembly runs at speed nine (24000 RPMs) for approximately thirty seconds to finish the puree of the food items. At step 1330, when the timer is finished, the variable temperature blender may audibly beep multiple times. The variable temperature blender can then beep two additional times in quick succession every minute until the user depresses the cancel button or removes the vessel assembly from the base assembly.

Figure 16A:
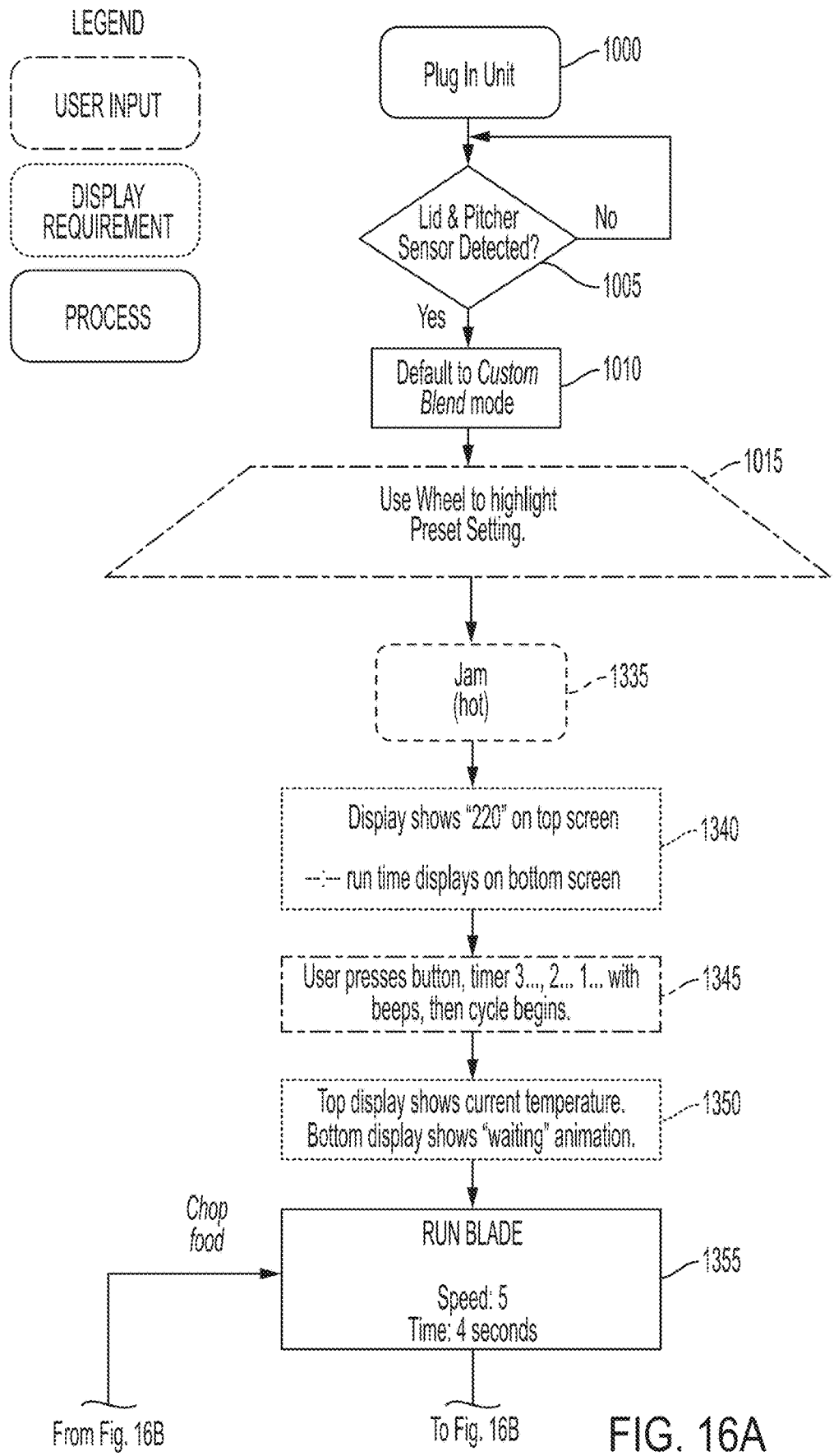
FIGS. 16A and 16B show a flowchart of a jam operational mode for the variable temperature blender in an embodiment of the disclosure.
Figure 16B:
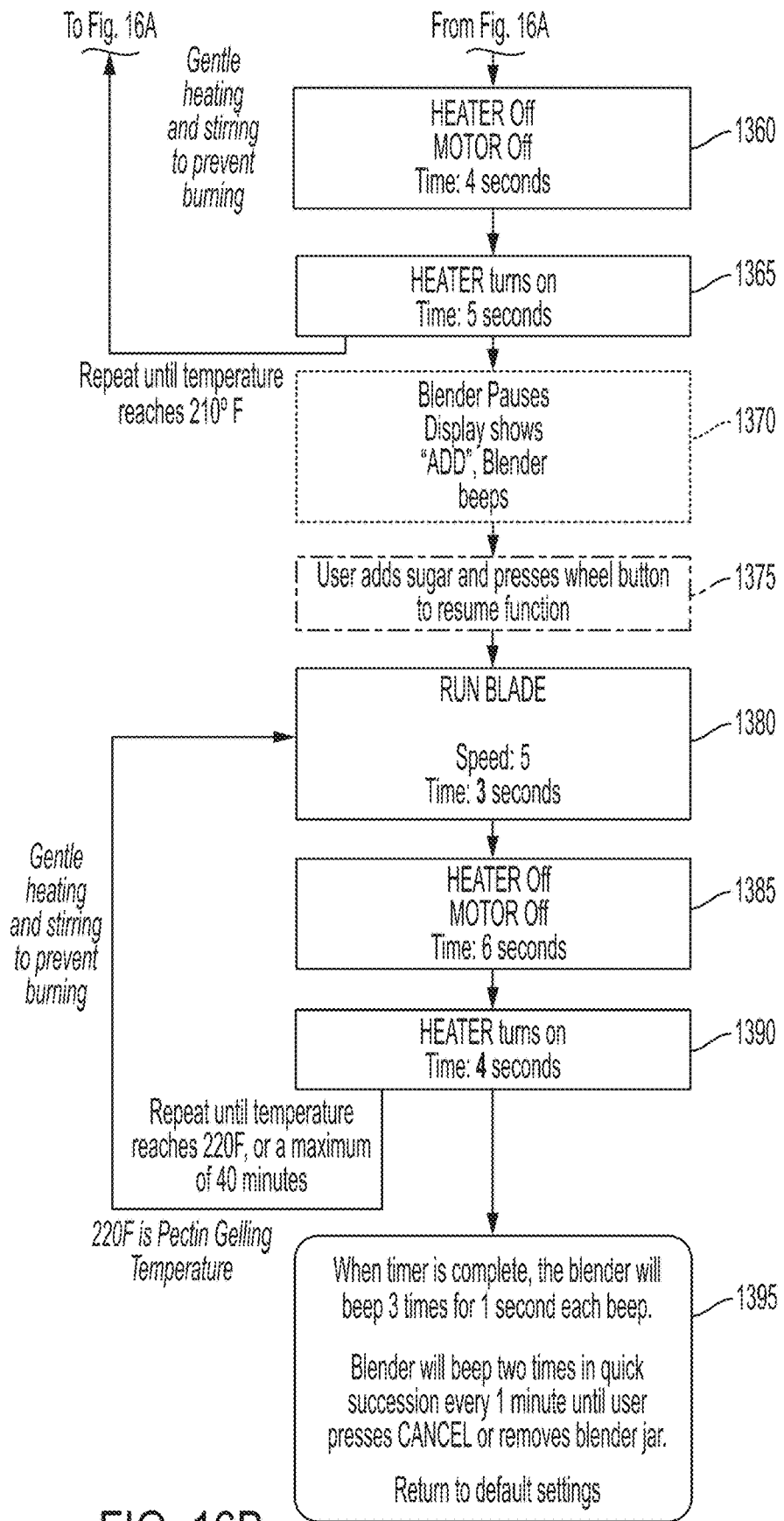

In FIGS. 16A to 16B, if the jam mode is selected at step 1335, the jam mode LED is lit solid to notify the user of the selection. At step 1340, the speed/temperature display shows a "220" and the time display shows a "- -:- -". This is because the temperature, speed, and time needed to complete the cooking process of the jam varies significantly during the mode's operation. At step 1345, the user can then depress the dial button to start the jam mode cycle. The variable temperature blender can then beep slowly for three seconds signifying the beginning for the jam mode cycle. After the jam mode is initialized, at step 1350 the speed/temperature display shows the current temperature of the food items in a blinking fashion. The time display communicates the "waiting" animation described above. Next, in step 1355 the blade assembly runs at a certain sped for a certain duration of time (e.g., speed five (10000 RPMs) for four seconds) to start chopping the food items while the heating element is active. Afterwards, in step 1360 the heating element turns off and the motor turns off (e.g., for four seconds) so that the blade assembly is not in operation. Then, in step 1365 the heating element turns on to heat the food items for approximately five seconds. The cycle of steps 1355, 1360, and 1365 is repeated until a temperature of 210° F. is reached. This cycle gently heats and stirs the food items to prevent burning. It is important to keep the temperature during this stage of the jam mode cycle below the boiling point of 212° F. Once 210° F. is reached by the temperature sensor, at step 1370 there is a pause, audible beeps, and an "ADD" option appears for display to prompt the user to add sugar. At step 1375, the user adds sugar and presses the dial button to resume the program. At step 1380 the blades turn at a certain speed for a certain amount of time (e.g., speed five for three seconds) so as to prevent burning (e.g. of the sugar). Afterwards, in step 1385 the heating element turns off and the motor turns off so that the blade assembly is not in operation for approximately six seconds. Then, in step 1390 the heating element turns on to heat the food items for approximately four seconds. The cycle of steps 1380, 1385, and 1390 is repeated until the temperature sensor records a temperature of ~219 to 220° F. for the food items. This allows for gentle stirring of and heating of the food items to prevent burning. The temperature of 220° F. is a specific pectin temperature setting allowing the formation (e.g., gelling) of the jam requested in this mode of operation. The blade assembly running during this heating process helps prevent sugar within the jam from burning. The above cycle repeats until the temperature reaches 220° F., of a maximum of forty minutes as a safety measure. Then, at step 1395, when finished, the variable temperature blender may audibly beep multiple times. The variable temperature blender can then beep two additional times in quick succession every minute until the user depresses the cancel button or removes the vessel assembly from the base assembly.

Figure 17A:
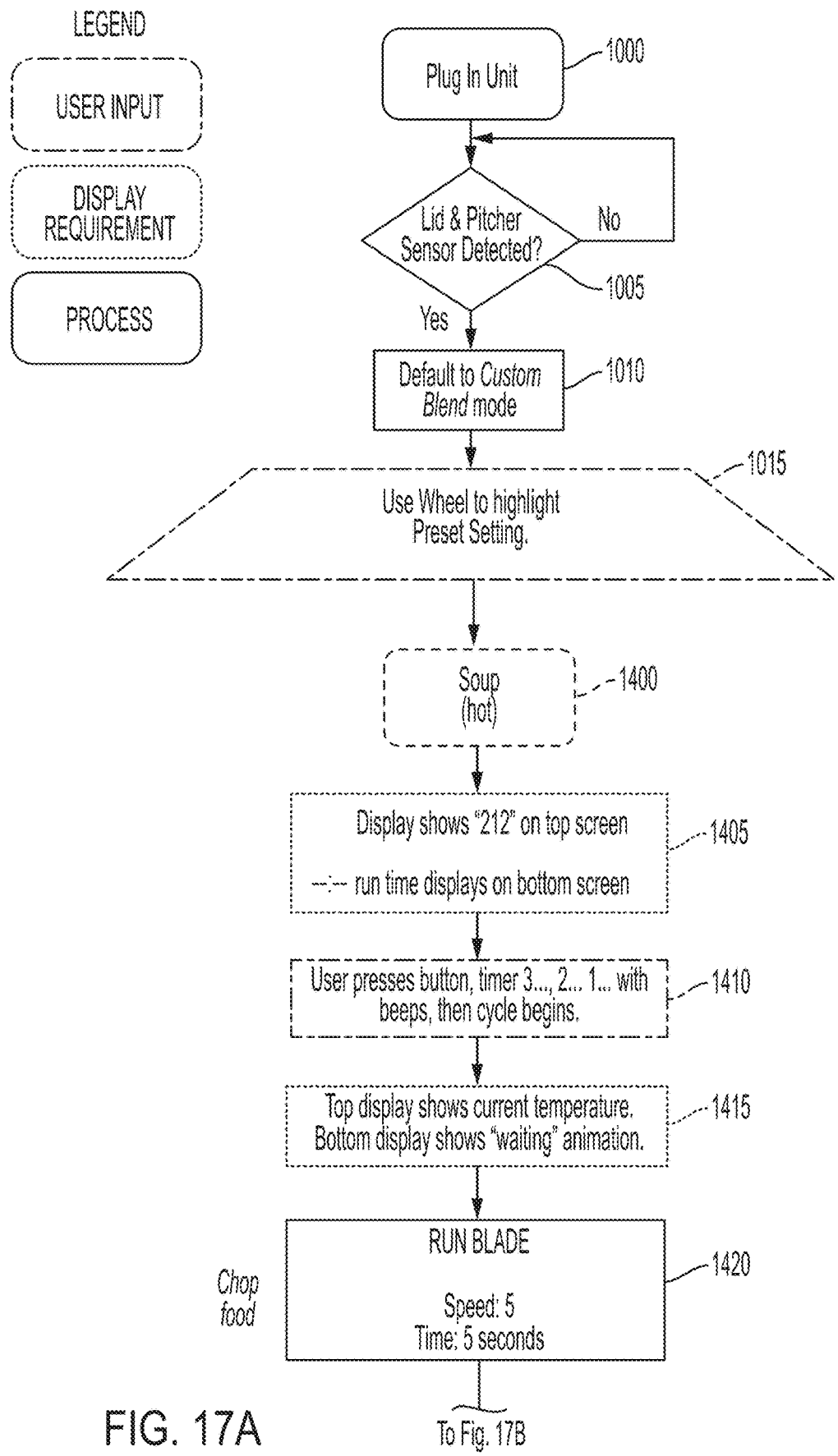
FIGS. 17A and 17B show a flowchart of a soup operational mode for the variable temperature blender in an embodiment of the disclosure.
Figure 17B:
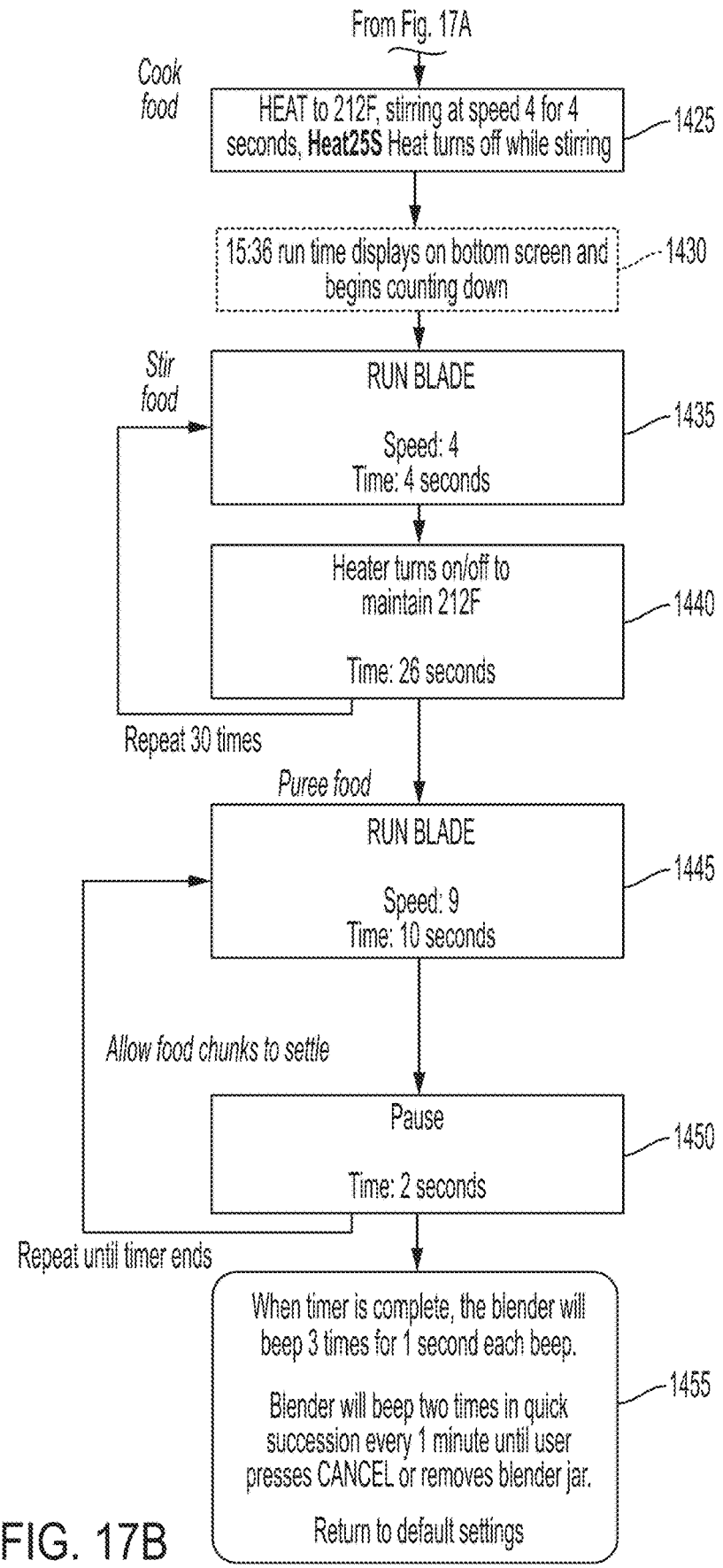

In FIGS. 17A and 17B, if the soup mode is selected at step 1400, the soup mode LED is lit solid to notify the user of the selection. At step 1405, the speed/temperature display shows a "212" and the time display shows a "-". This is because the temperature, speed, and time needed to complete the cooking process of the soup varies significantly during the mode's operation. At step 1410, the user can then depress the dial button to start the soup mode cycle. The variable temperature blender can then beep slowly for three seconds signifying the beginning for the soup mode cycle. After the soup mode is initialized, at step 1415 the speed/temperature display shows the current temperature of the food items in a blinking fashion. The time display communicates the "waiting" animation described above. Next, at step 1420, the blade assembly runs at a certain speed for a certain amount of time (e.g., speed five for five seconds, or speed one (100 RPMs) for two seconds) to chop the food items. Afterwards, at step 1425, the heating element turns on and continues to heat and cook the food items until a temperature of 212° F. is reached and recorded by the temperature sensor. This includes stirring at speed four for four seconds, then heating for twenty-five seconds, with the heating turning off while stirring is being performed. Once boiling or 212° F. is reached, at step 1430 the speed/temperature display shows the current temperature in a solidly lit format. The time display then displays a timer (e.g., 15:36 run time) that begins a count down. Additional cycles continue to cook the soup. At step 1435, the blade assembly runs at a certain speed for a certain amount of time (e.g., speed four for four seconds, or speed one (100 RPMs) for two seconds). Then, at step 1440, the heating element activates or deactivates during a time period (e.g., 26 seconds, or a two minute period) to maintain the temperature of the food items at 212° F. This (e.g., first cycle) repeats (e.g., ten to thirty times) to finish cooking the food before moving on to the steps which include a puree step. At step 1445, the puree (e.g., second) cycle begins with the blade assembly running at speed one to speed nine for ten seconds (alternatively there can be a gradually increasing speed from one speed to another (e.g., speed one to speed nine (100 RPMs-24000 RPMs) for ten seconds)). This is followed up at step 1450 by a two second pause to allow food items to settle at the bottom of the blending vessel. This second cycle purees the food items and is repeated (e.g., fourteen) times until the timer ends (so that the soup is very smooth). At step 1455, when finished, the variable temperature blender may audibly beep multiple times. The variable temperature blender can then beep two additional times in quick succession every minute until the user depresses the cancel button or removes the vessel assembly from the base assembly.

Figure 18A:
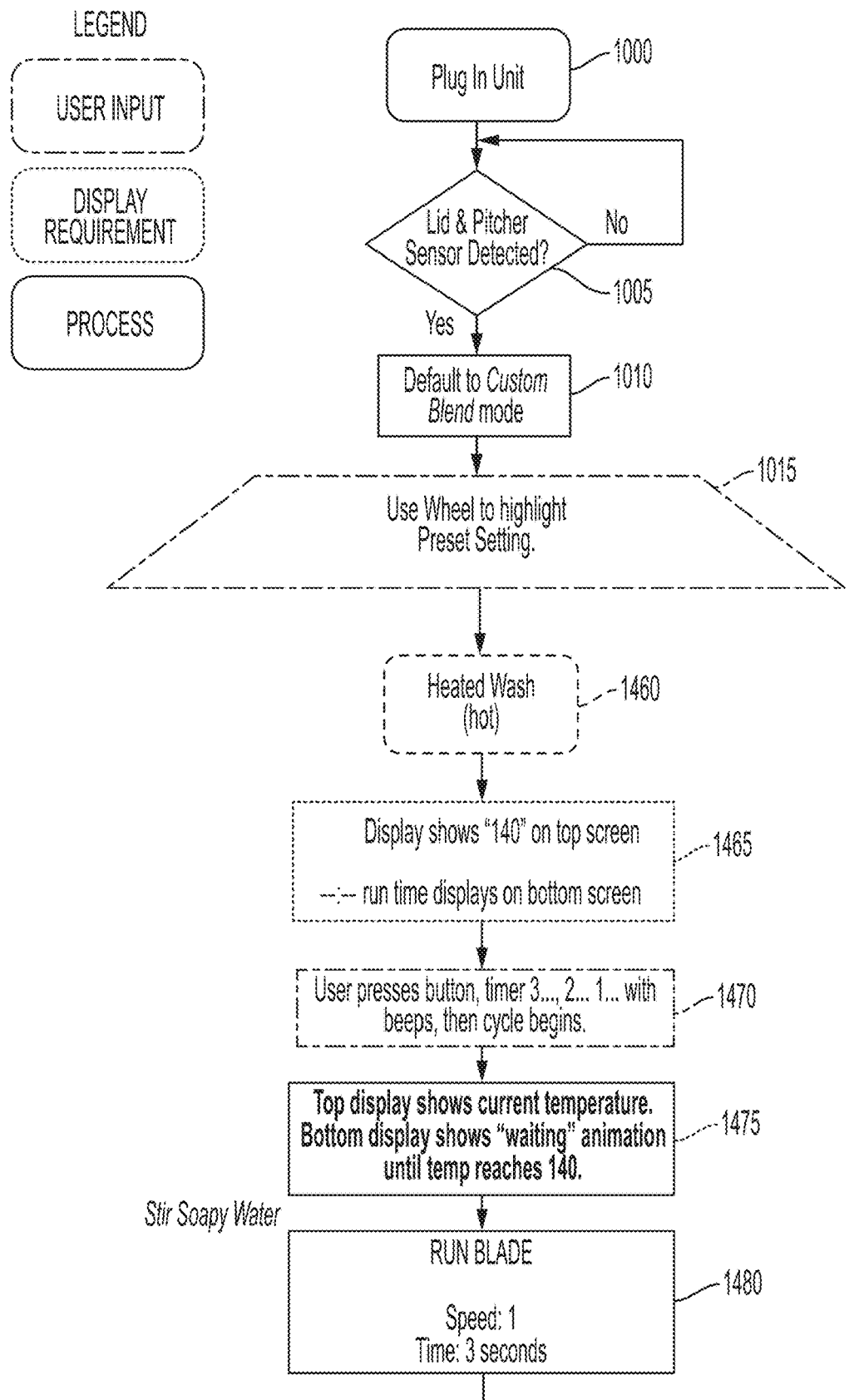
FIGS. 18A and 18B show a flowchart of a heated wash operational mode for the variable temperature blender in an embodiment of the disclosure.
Figure 18B:
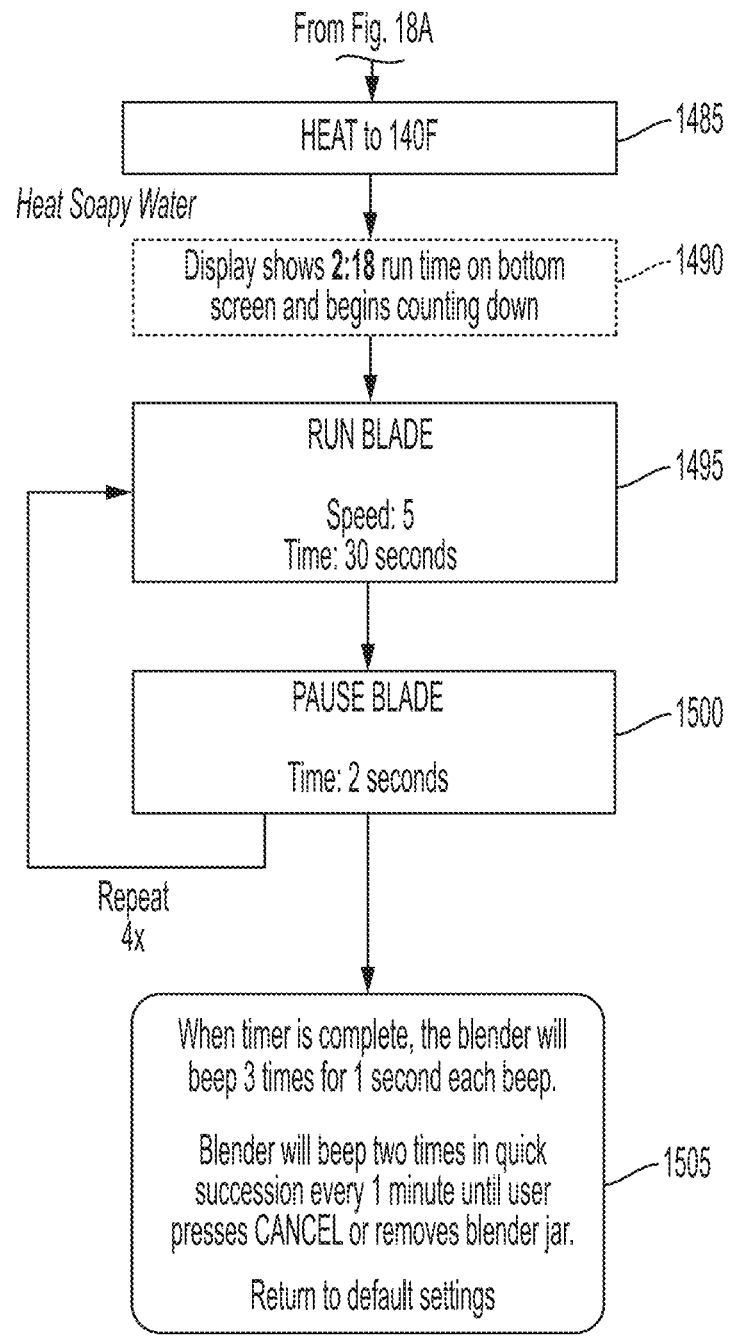

In FIGS. 18A and 18B, if the heated wash mode is selected at step 1460, the heated wash mode LED is lit solid to notify the user of the selection. At step 1465, the speed/temperature display shows a "140" and the time display shows a "-". This is because the temperature, speed, and time needed to complete the heated wash varies significantly during the mode's operation. At step 1470, the user can then depress the dial button to start the heated wash mode cycle. The variable temperature blender can then beep slowly for three seconds signifying the beginning for the heated wash mode cycle. After the heated wash mode is initialized, at step 1475 the speed/temperature display shows the current temperature of the food items, or in this case water and soap, in a blinking fashion. The time display communicates the "waiting" animation described above until a temperature of 140° F. (or up to 165° F.) is achieved. At step 1490, the blades run at a certain speed for a certain amount of time (e.g., speed one for three seconds) for stirring of the soapy water, and at step 1485 the heating element turns on and heats the water and soap mixture to 140° F. (or up to 165° F.). Next, at step 1490, the display may show the current temperature, and timer displays a time and begins counting down. For example, the time display shows a two minute timer (e.g., 2:18) and begins a count down. At step 1495, the blade assembly runs at a certain speed for a certain amount of time (e.g., speed five (10000 RPMs) for thirty seconds) to clean the blade assembly and the blending vessel. At step 1500 the blade assembly then pauses operation for two seconds. This process is repeated four times until the countdown is complete. When finished, at step 1505 the variable temperature blender may audibly beep multiple times. The variable temperature blender can then beep two additional times in quick succession every minute until the user depresses the cancel button or removes the vessel assembly from the base assembly.

Figure 19A:
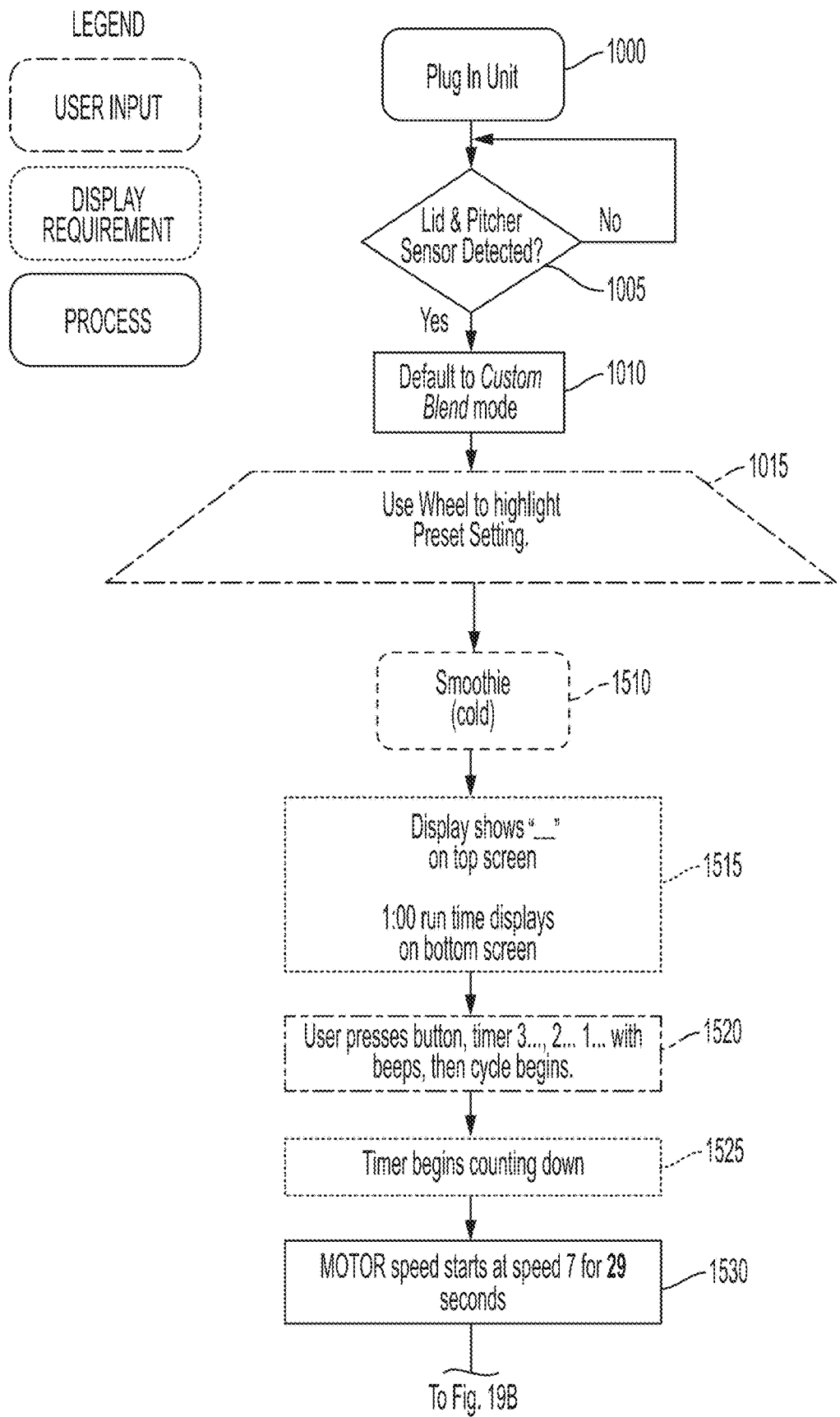
FIGS. 19A and 19B show a flowchart of a smoothie operational mode for the variable temperature blender in an embodiment of the disclosure.
Figure 19B:
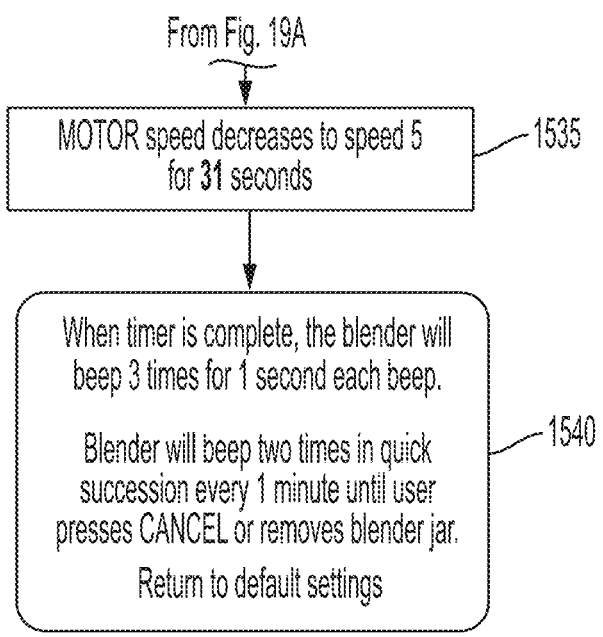

In FIGS. 19A and 19B, if the smoothie mode is selected at step 1510, the smoothie mode LED is lit solid to notify the user of the selection. At step 1515, the speed/temperature display shows a "_" and the time display shows a one minute timer. At step 1520, the user can then depress the dial button to start the smoothie mode cycle. The variable temperature blender can then beep slowly for three seconds signifying the beginning for the smoothie mode cycle. After the smoothie mode is initialized, time display begins the count down at step 1525. At step 1530, the motor speed starts at speed seven for a time duration such as twenty-nine second. At step 1535 the motor speed then decreases to speed five for thirty-one seconds. When finished, at step 1540 the variable temperature blender may audibly beep multiple times. The variable temperature blender can then beep two additional times in quick succession every minute until the user depresses the cancel button or removes the vessel assembly from the base assembly.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the options descripted and available for electronic content items to be sent or received in a user's inbox or outbox may be adjusted and customized to include more options not expressly discussed within the present application. Thus, the breadth and scope of the present invention should not be limited by any of the above-described example embodiments, but should be defined only in accordance with the following claims appended hereto and their equivalents.

What is claimed is:

1. A variable temperature blender comprising:
a lid assembly;
a vessel assembly comprising;
   a blending vessel;
   a collar, the collar having a collar sidewall housing a collar interior as an upper collar section and a lower collar section, the collar attached to a bottom portion of the blending vessel within the upper collar section, and the lower collar section terminating at a collar base, the collar base corresponding to a bottom of the vessel assembly;
   a heating element coupled to a least one heating element contact, the heating element and the at least one heating contact contained within the collar interior;
   a temperature sensor contained within the collar interior, the temperature sensor in thermal communication with the blending vessel to monitor a temperature measurement of at least one food item contained within the blending vessel; and
   a vessel assembly electrical interface contained within the collar interior adjacent the collar base, the vessel assembly electrical interface electrically connected to each the heating element, via the at least one heating element contact, and the temperature sensor to (1) transmit operational commands for execution by each the heating element and the temperature sensor, and (2) receive operational data of each the heating element, via the at least one heating element contact, and the temperature sensor;
a base assembly, the base assembly having a base assembly electrical interface on a top surface of the base assembly, a user interface, a motor, and a controller, the vessel assembly via the collar base being removably attachable to the top surface of the base assembly, and wherein attachment of the collar base of the vessel assembly with the top surface of the base assembly permits electrical communication between the vessel assembly electrical interface and the base assembly electrical interface;
wherein the controller stores a plurality of operational modes, the user interface allows for controller operation of a selected operational mode, and the controller is configured to control (i) heating of the heating element via an electronic heating control signal transmitted from the controller through electrical communication between the base assembly electrical interface and the vessel assembly electrical interface, the electronic heating control signal activating or deactivating a heating operation by the heating element upon the at least one food item contained within the blending vessel, (ii) the electronic heating element control signal being based on a stored operational step within the controller of the selected operational mode, and (iii) activation of a safety indicator of the user interface when the temperature measurement of the at least one food item received by the controller exceeds a stored safe temperature threshold during operation of the selected operational mode; and
wherein the selected operational mode is a cream sauce mode, the cream sauce mode selected to create a cream sauce where the at least one food item includes at least one dairy product added to the blending vessel for operation of the cream sauce mode.

2. The variable temperature blender of claim 1, wherein the base assembly electrical interface and the vessel assembly electrical interface form a pin and socket electrical interface.

3. The variable temperature blender of claim 2, wherein the vessel assembly electrical interface is one of a pin electrical interface or a socket electrical interface, the base assembly electrical interface is the other of the pin electrical interface or the socket electrical interface, and attachment of the collar base of the vessel assembly to the top surface of the base assembly establishes the pin and socket electrical interface connection.

4. The variable temperature blender of claim 1, wherein the vessel assembly has a lid switch, the lid switch being in electrical communication with the vessel assembly electrical interface.

5. The variable temperature blender of claim 4, wherein the lid assembly has a lid including a protrusion extending from the lid, the blending vessel has a handle, and the lid switch is within the handle.

6. The variable temperature blender of claim 5, wherein the controller is configured to (i) detect a status of the lid switch, and (ii) enable or disable execution of the cream sauce mode based on the detected status of the lid switch.

7. The variable temperature blender of claim 6, wherein when the lid is attached to the blending vessel in a locked position, the protrusion engages the lid switch, and the status of the lid switch is an engaged status which, when detected by the controller, permits the execution of the cream sauce mode by the controller.

8. The variable temperature blender of claim 6, wherein when the lid is not attached to the blending vessel in a locked position, the protrusion does not engage the lid switch, and the status of the lid switch is a disengaged status which, when detected by the controller, does not permit the execution of the cream sauce mode by the controller.

9. The variable temperature blender of claim 1, wherein the cream sauce mode is one of the plurality of operational modes, the controller has a memory, and the memory is configured to store the plurality of operational modes.

10. The variable temperature blender of claim 9, wherein the at least dairy product is a dairy based cream.

11. The variable temperature blender of claim 1, wherein the cream sauce mode comprises the controller being configured to control the heating of the heating element to arrive at (i) a first cream sauce temperature setting, and (ii) a second cream sauce temperature setting.

12. The variable temperature blender of claim 11, wherein the temperature measurement of the second cream sauce temperature setting is higher than the temperature measurement of the first cream sauce temperature setting.

13. The variable temperature blender of claim 12, wherein the temperature measurement of the second cream sauce temperature setting is below a boiling point temperature for the cream sauce.

14. The variable temperature blender of claim 1, further comprising a blade assembly, wherein the at least one food item includes ingredients along with the at least one dairy product for the cream sauce, and the controller is further configured to:
control rotation of the blade assembly via the motor via transmission of an electronic motor control signal from the controller;
activate heating by the heating element to arrive at a first predetermined temperature for the cream sauce mode;
rotate the blade assembly to mix the ingredients including the at least one dairy product for a first predetermined amount of time at a first predetermined rotation rate of the blade assembly;
receive a first temperature sensor reading from the temperature sensor, the first temperature sensor reading including first data representative of a first detected temperature of the ingredients;
make a first determination of whether the first detected temperature is below the first predetermined temperature and activate heating by the heating element if the result of the first determination is that the first detected temperature is below the first predetermined temperature;
when the result of the first determination is that the first detected temperature equals the first predetermined temperature, deactivate the blade assembly and deactivate heating by the heating element;
prompt, via the user interface, instruction to add a second ingredient to the blending vessel with the ingredients including the at least one dairy product in the cream sauce mode, and after addition of the second ingredient prompt interaction with the user interface to resume operation of the cream sauce mode;
rotate the blade assembly to mix the ingredients including the at least one dairy product and the second ingredient for a second predetermined amount of time at a second predetermined rotation rate of the blade assembly;
deactivate both the blade assembly and the heating element for the second predetermined amount of time;
activate heating by the heating element to arrive at a second predetermined temperature for the cream sauce mode;
receive a second temperature sensor reading from the temperature sensor, the second temperature sensor reading including second data representative of a second detected temperature of the ingredients including the second ingredient;
make a second determination of whether the second detected temperature is below the second predetermined temperature, and if the result of the second determination is that the second detected temperature is below the second predetermined temperature, activate rotation of the blade assembly at the first predetermined rotation rate of the blade assembly, followed by deactivation of both the blade assembly and heating element for the first predetermined amount of time, and then activate heating by the heating element;
when the result of the second determination is that the second detected temperature is greater than or equal to the second predetermined temperature, deactivate the heating by the heating element and activate rotation of the blade assembly for the first predetermined amount of time at the first predetermined rotation rate of the blade assembly; and
provide an indication via the user interface that the cream sauce mode is complete.

15. The variable temperature blender of claim 14, wherein the cream sauce mode operates and uses the at least one food ingredient, the at least one dairy product, and the second ingredient to create a custard, a pudding, a crème anglaise, an ice cream base, a roux-based sauce, a gravy, a hollandaise sauce, a butter sauce, a cornstarch-based sauce, or a barbecue sauce.

16. A method to create a cream sauce with a variable temperature blender, the method comprising:

placing at least one food item, the at least one food item including at least one dairy product, into a blending vessel of the variable temperature blender, the blending vessel being part of a vessel assembly;

selecting a cream sauce mode from a plurality of operational modes stored within a controller of a base assembly of the variable temperature blender, selection of the cream sauce mode accomplished via a user interface on the base assembly;

placing the controller and a motor of the base assembly into an operational state for the cream sauce mode;

placing a heating element and a temperature sensor into the operational state for the cream sauce mode via an electrical signal communicated from the controller through a base assembly electrical interface connected to and in communication with a vessel assembly electrical interface, the vessel assembly electrical interface being connected to and in communication with each the heating element and the temperature sensor, each the heating element, temperature sensor, and vessel assembly electrical interface contained within a collar interior of a collar of the vessel assembly, the collar having a collar sidewall housing the collar interior as an upper collar section and a lower collar section, the collar attached to a bottom portion of the blending vessel within the upper collar section and the vessel assembly electrical interface being within the lower collar section adjacent a collar base removably attachable to the base assembly;

placing a user interface of the base assembly into the operational state for the cream sauce mode, the cream sauce mode being a heated operational mode of the variable temperature blender requisite of controller monitoring of a temperature measurement of the at least one food item including at least one dairy product taken by the temperature sensor and transmitted to the controller;

comparing the temperature measurement received by controller with a stored safe temperature threshold during operation of the cream sauce mode;

activating a safety indicator of the user interface when the temperature measurement received by the controller of the at least one food item including at least one dairy product exceeds the stored safe temperature threshold during operation of the cream sauce mode, activation of the safety indicator being continued until the temperature measurement received by the controller of the at least one food item including at least one dairy product falls below the stored safe temperature threshold during operation of the cream sauce mode;

activating rotation of a blade assembly of the vessel assembly via a mechanical connection to the motor of the base assembly to mix and prevent burning of the at least one food item including at least one dairy product;

activating heating by the heating element to heat the at least one food item including at least one dairy product;

receiving a first temperature sensor reading from the temperature sensor;

determining whether the received first temperature sensor reading is at or below a first predetermined temperature reading for the cream sauce mode;

activating the heating element when a result of the determination is that the first temperature sensor reading is below the first predetermined temperature reading for the cream sauce mode;

deactivating heating by the heating element and deactivating rotation of the blade assembly if the received first temperature sensor reading is at the first predetermined temperature reading for the cream sauce mode;

prompting, via the user interface, instruction to add a second ingredient to the blending vessel with the at least one food item including at least one dairy product;

prompting interaction with the user interface to resume operation of the cream sauce mode after the second ingredient is added to the blending vessel with the at least one food item including at least one dairy product;

rotating the blade assembly to mix the at least one food item, the at least one dairy product, and the second ingredient for a first predetermined amount of time at a first predetermined rotation rate of the blade assembly;

deactivating both rotation of the blade assembly and heating by the heating element for the first predetermined amount of time;

activating heating by the heating element to arrive at a second predetermined temperature for the cream sauce mode;

determining whether a second temperature sensor reading is below a second predetermined temperature, and, if the result of the determination is that the second temperature sensor reading is below the second predetermined temperature, activate rotation of the blade assembly at the first predetermined rotation rate of the blade assembly, followed by deactivation of both the blade assembly and heating element for the first predetermined amount of time, and then activating heating by the heating element; and determining whether the second temperature sensor reading is at or above the second predetermined temperature, and, if the result of the determination is that the second temperature sensor reading is at or above the second predetermined temperature, then activating rotation of the blade assembly at a second predetermined rotation rate of the blade assembly at a second predetermined amount of time.

17. The method of claim 16, wherein the at least one dairy product is a dairy based cream.

18. The method of claim 16, wherein the selecting of the cream sauce mode from the plurality of operational modes comprises a user operating a control dial of the user interface.

19. The method of claim 16, further comprising indicating, via an audio signal, completion of the cream sauce mode for the variable temperature blender.

20. The method of claim 16, wherein the cream sauce mode operates and uses the at least one food ingredient, the at least one dairy product, and the second ingredient to create a custard, a pudding, a crème anglaise, an ice cream base, a roux-based sauce, a gravy, a hollandaise sauce, a butter sauce, a cornstarch-based sauce, or a barbecue sauce.

* * * * *